(12) United States Patent
He et al.

(10) Patent No.: US 11,924,464 B2
(45) Date of Patent: Mar. 5, 2024

(54) PROCESSING VIDEO DATA PICTURE SIZE CHANGE REQUEST AND NOTIFICATION MESSAGES

(71) Applicant: QUALCOMM Incorporated, San Diego, CA (US)

(72) Inventors: Yong He, San Diego, CA (US); Muhammed Zeyd Coban, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/819,703

(22) Filed: Aug. 15, 2022

(65) Prior Publication Data
US 2023/0093017 A1    Mar. 23, 2023

Related U.S. Application Data

(60) Provisional application No. 63/261,403, filed on Sep. 20, 2021.

(51) Int. Cl.
*H04N 19/59* (2014.01)
*H04N 19/105* (2014.01)
*H04N 19/593* (2014.01)

(52) U.S. Cl.
CPC .......... *H04N 19/59* (2014.11); *H04N 19/105* (2014.11); *H04N 19/593* (2014.11)

(58) Field of Classification Search
CPC .... H04N 19/59; H04N 19/105; H04N 19/593; H04N 19/132; H04N 19/156; H04N 19/46; H04N 19/177
See application file for complete search history.

(56) References Cited

U.S. PATENT DOCUMENTS 10,165,218 B2 * 12/2018 Fernandes ............ G09G 3/3406
10,341,686 B2 *  7/2019 Ducloux .............. H04N 19/156
(Continued)

FOREIGN PATENT DOCUMENTS

EP    3038366 A1 *  6/2016
EP    3099080 A1    11/2016
(Continued)

OTHER PUBLICATIONS

Information Technology—MPEG Video Technologies—Part 7: Versatile Supplemental Enhancement Information Messages for Coded Video Bitstreams, ISO/IEC FDIS 23002-7:202x (2nd Ed.) (E), ISO/IEC JTC 1/SC 29/WG 5 N100, Apr. 14, 2022, 132 Pages.
(Continued)

*Primary Examiner* — Francis Geroleo
(74) *Attorney, Agent, or Firm* — Shumaker & Sieffert, PA

(57) ABSTRACT

An example device for requesting a reduced resolution for video data includes a memory configured to store video data; and one or more processors implemented in circuitry and configured to: decode a first sequence of pictures of a bitstream, the first sequence of pictures having a first resolution; in response to determining that the device is to enter a power saving mode, send a message requesting a reduced resolution relative to the first resolution for a second sequence of pictures, the second sequence of pictures being subsequent to the first sequence of pictures in coding order; and decode the second sequence of pictures of the video data of the bitstream, the second sequence of pictures having the reduced resolution. The reduced resolution may be reduced spatial resolution, reduced temporal resolution (frame rate), or both.

24 Claims, 13 Drawing Sheets

| 0 1 2 3 4 5 6 7 8 9 | 0 1 2 3 4 5 6 7 8 9 | 0 1 2 3 4 5 6 7 8 9 0 1 |
|---|---|---|
| | SSRC 141 | |
| SEQUENCE NUM. 142 | LAYER ID 143 | T. ID 144 | PADDING 145A |
| PICTURE WIDTH 146 | PICTURE HEIGHT 147 | PADDING 145B |

140

(56) References Cited

U.S. PATENT DOCUMENTS

2014/0334797 A1* 11/2014 Lee .................. G11B 27/28
  386/241
2018/0115784 A1* 4/2018 He .................. H04N 19/523

FOREIGN PATENT DOCUMENTS

EP        3846478 A1    7/2021
WO     2017205069 A1   11/2017

OTHER PUBLICATIONS

"Information Technology—MPEG Systems Technologies—Part 11: Energy-Efficient Media Consumption (Green Metadata)", ISO/IEC 23001-11, 2015, 93 Pages.
International Search Report and Written Opinion—PCT/US2022/075010—ISA/EPO—dated Dec. 6, 2022, 12 Pages.
ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.
ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.
ITU-T H.271:"Series H: Audiovisual and Multimedia Systems Infrastructure of Audiovisual Services—Coding of Moving Video", Video Back-Channel Messages for Conveyance of Status Information and Requests from a Video Receiver to a Video Sender, International Telecommunication Union, May 2006, 22 Pages.
ITU-T H.274:" Series H: Audiovisual and Multimedia Systems Infrastructure of audiovisual services—Coding of moving video", Versatile Supplemental Enhancement Information Messages for Coded Video Bitstreams, International Telecommunication Union, May 2022, 110 Pages.
Systems: "Preliminary WD of Green MPEG", 105, MPEG Meeting, Vienna, (Motion Picture Expert Group or ISO/IEC JTC1/SC29/WG11), No. N13719, Jul. 29, 2013-Aug. 2, 2013, Aug. 2, 2013, XP030020467, 19 Pages.
Wenger S., et al., "Codec Control Messages in the RTP Audio-Visual Profile with Feedback (AVPF)", Network Working Group—Request for Comments: No. FRC 5104, Feb. 2008, pp. 1-64.
Wenger S., et al., "Extended RTP Profile for Real-time Transport Control Protocol (RTCP)-Based Feedback (RTP/AVPF)", RFC4585, IETF Standard, Internet Engineering Task Force, IETF, CH,Ott Helsinki University of Technology, The Internet Society, Jul. 1, 2006 (Jul. 1, 2006), XP015055018, 51 Pages.

* cited by examiner

PROCESSING VIDEO DATA PICTURE SIZE CHANGE REQUEST AND NOTIFICATION MESSAGES

This application claims the benefit of U.S. Provisional Application No. 63/261,403, filed Sep. 20, 2021, the entire contents of which are hereby incorporated by reference.

TECHNICAL FIELD

This disclosure relates to video coding, including video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

In some cases, a video decoder may send a message to a video encoder to request modifications to video coding determinations. For example, Wenger et al., "Codec Control Messages in the RTP Audio-Visual Profile with Feedback (AVPF)," Network Working Group, RFC 5104, February 2008, describes codec control messages for Real-time Transport Protocol (RTP) in conversational multimedia scenarios, including full intra request (FIR), temporal-spatial trade-off request (TSTR) and notification (TSTN), ITU-T H.271 video back channel message (VBCM), temporary maximum media stream bit rate request (TMMBR) and notification (TMMBN).

SUMMARY

In general, this disclosure describes techniques by which a video decoder may send requests to change picture resolution to a video encoder. In some examples, the request (referred to herein as a video spatial resolution request (VSRR)) may be to change a spatial resolution in which pictures are coded. The request may signal the explicit width and height of the coding picture of a specific temporal or spatial layer. The request may signal the resolution reduction or increment percentage of the original picture size. The request may also be to encode a specific region of the picture or a set of sub-pictures of a temporal or spatial layer. Additionally or alternatively, the video decoder may request a reduced temporal resolution (i.e., frame rate) of a sequence of pictures. Reducing the spatial and/or temporal resolution of pictures of a sequence of pictures may reduce power consumed by the video decoder to decode the reduced resolution pictures.

In one example, a method of requesting a reduced resolution for video data includes decoding, by a video decoder of a client device, a first sequence of pictures of a bitstream, the first sequence of pictures having a first resolution; in response to determining that the client device is to enter a power saving mode, sending, by the client device, a message requesting a reduced resolution relative to the first resolution for a second sequence of pictures, the second sequence of pictures being subsequent to the first sequence of pictures in coding order; and decoding, by the video decoder of the client device, the second sequence of pictures of the video data of the bitstream, the second sequence of pictures having the reduced resolution.

In another example, a device for requesting a reduced resolution for video data includes a memory configured to store video data; and one or more processors implemented in circuitry and configured to: decode a first sequence of pictures of a bitstream, the first sequence of pictures having a first resolution; in response to determining that the device is to enter a power saving mode, send a message requesting a reduced resolution relative to the first resolution for a second sequence of pictures, the second sequence of pictures being subsequent to the first sequence of pictures in coding order; and decode the second sequence of pictures of the video data of the bitstream, the second sequence of pictures having the reduced resolution.

In another example, a computer-readable storage medium has stored thereon instructions that, when executed, cause a processor of a client device to: decode a first sequence of pictures of a bitstream, the first sequence of pictures having a first resolution; in response to determining that the device is to enter a power saving mode, send a message requesting a reduced resolution relative to the first resolution for a second sequence of pictures, the second sequence of pictures being subsequent to the first sequence of pictures in coding order; and decode the second sequence of pictures of the video data of the bitstream, the second sequence of pictures having the reduced resolution.

In another example, a device for requesting a reduced resolution for video data, the device comprising: means for decoding a first sequence of pictures of a bitstream, the first sequence of pictures having a first resolution; means for sending a message requesting a reduced resolution relative to the first resolution for a second sequence of pictures, the second sequence of pictures being subsequent to the first sequence of pictures in coding order in response to determining that the client device is to enter a power saving mode; and means for decoding the second sequence of pictures of the video data of the bitstream, the second sequence of pictures having the reduced resolution.

The details of one or more examples are set forth in the accompanying drawings and the description below. Other features, objects, and advantages will be apparent from the description, drawings, and claims.

DETAILED DESCRIPTION

Figure 1:
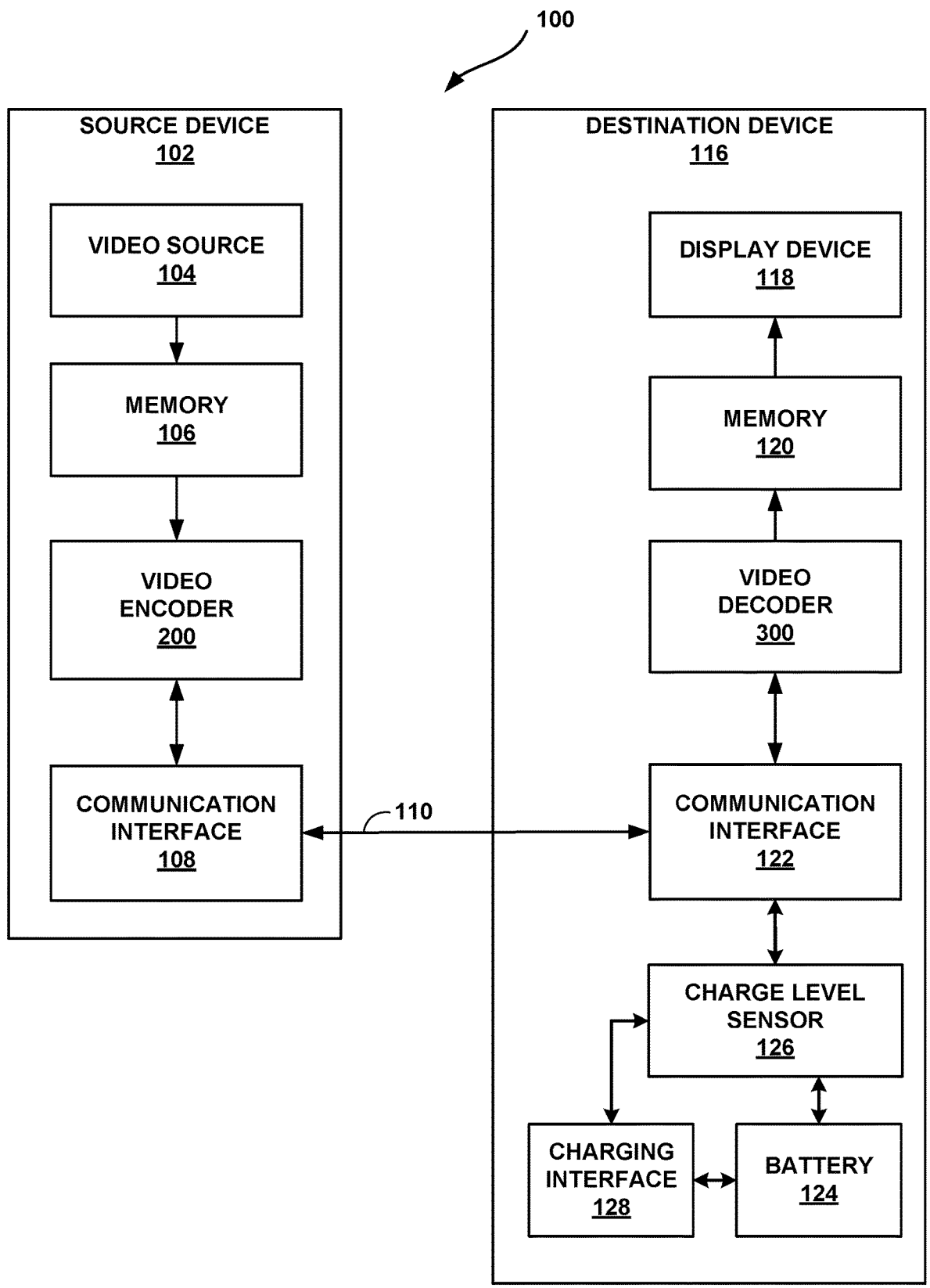
FIG. 1 is a block diagram illustrating an example video encoding and decoding system that may perform the techniques of this disclosure.

The versatile supplemental enhancement information (VSEI) standard, that is ITU-T H.274 and ISO/IEC 23002-7, supports picture spatial resolution changes within a coded layer video sequence (CLVS). Similarly, ITU-T H.266/Versatile Video Coding (VVC) allows for sending resolution change requests in a CLVS. ISO/IEC 23001-11 (referred to as "green MPEG"), specifies complexity metrics and interactive signaling for the energy-efficient media consumption. A client may request remote decoder-power reduction by signaling an expected percentage reduction of local decoding operations to the encoder. The encoder may disable specific coding tools to reduce the decoder power consumption, which may also reduce the coding efficiency and introduce visible artifacts. It may be desirable to request a resolution change explicitly when the decoder power is not enough to complete the conversation and/or the transmission bandwidth is low while maintaining decent coding efficiency.

In addition, when the transmission bandwidth is limited, the same amount of bits used to encode a small size picture may end up with better quality than using the same amount of bits to encode a large size picture. Downsampling a picture before encoding may reduce the bandwidth and coding complexity while maintain decent picture quality. An alternative approach is to encode a portion of a picture, a.k.a., a region of interest, to reduce the bandwidth and coding complexity.

Temporal resolution or frame rate can also impact decoder energy consumption. The decoder may extract certain temporal sublayers to reduce the frame rate, but the receiver may still consume the energy when receiving those frames not to be decoded. It may be desirable to indicate to the encoder to encode the video at lower frame rate to reduce the decoding complexity and also to reduce energy consumption by the receiver including the decoder.

According to the techniques of this disclosure, a video decoder may send a video spatial resolution request (VSRR) to request that a video encoder change its coding resolution. The request may signal the explicit width and height of the coding picture of specific temporal or spatial layer. The request may signal the resolution reduction or increment percentage of the original picture size. The request may also request to encode a specific region of the picture or a set of sub-pictures of a temporal or spatial layer. The video encoder may reply with a video spatial resolution notification (VSRN) message representative of the actual resolution, which may be the same as or different than the requested resolution (or picture size).

In this manner, a client device including a video decoder may request a reduced resolution (e.g., spatial, temporal, or both) for a sequence of pictures of video data from a source device including a video encoder. The video decoder may consume less power when decoding fewer pictures over a period of time (e.g., video data with reduced temporal resolution/frame rate) and/or when the pictures have a reduced spatial resolution. Thus, the techniques of this disclosure may reduce the power consumption of the video decoder, thereby increasing battery life and reducing resources needed to charge the battery or keep the battery charged. Moreover, decreasing spatial and/or temporal resolution of pictures of video data may reduce bandwidth consumed by network devices between and including the source device and the client device. Furthermore, decreasing the spatial and/or temporal resolution may reduce processing needing to be performed by the video encoder to encode the video data. In this manner, these techniques may improve the fields of video coding and video transmission, as well as the performance of devices operating within those fields.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smart-phones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and communication interface 108. Destination device 116 includes communication interface 122, battery 124, charge level sensor 126, charging interface 128, video decoder 300, memory 120, and display device 118. Source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for processing a request to change a picture resolution. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via communication interface 108 onto computer-readable medium 110 for reception and/or retrieval by, e.g., communication interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of communication medium capable of sending the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Communication interface 108 may modulate a transmission signal including the encoded video data, and communication interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

Communication interface 108 and communication interface 122 may represent wireless transmitters/receivers, modems, wired networking components (e.g., Ethernet cards), wireless communication components that operate according to any of a variety of IEEE 802.11 standards, or other physical components. In examples where communication interface 108 and communication interface 122 comprise wireless components, communication interface 108 and communication interface 122 may be configured to transfer data, such as encoded video data, according to a cellular communication standard, such as 4G, 4G-LTE (Long-Term Evolution), LTE Advanced, 5G, or the like. In some examples where communication interface 108 comprises a wireless transmitter, communication interface 108 and communication interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or communication interface 108, and destination device 116 may include an SoC device to perform the functionality attributed to video decoder 300 and/or communication interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Communication interface 122 of destination device 116 receives an encoded video bitstream from computer-readable medium 110 (e.g., a communication medium). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that includes processing a request to change a picture resolution.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component may be an array or single sample from one of the three arrays (luma and two chroma) for a picture in 4:2:0, 4:2:2, or 4:4:4 color format, or an array or a single sample of the array for a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time.

In accordance with the techniques of this disclosure, destination device 116 and/or video decoder 300 may be configured to generate and send a request to source device 102 to change a picture resolution of coded video data. For example, battery 124 of destination device 116 may provide power to display device 118, memory 120, video decoder 300, communication interface 122, and charge level sensor 126, as well as other components of destination device 116 (not shown in FIG. 1).

In general, processing (e.g., decoding, rendering, and displaying) high resolution video data may consume a greater amount of power than processing lower resolution video data. The term "resolution" may refer to spatial resolution (e.g., width and height) of pictures and/or temporal resolution (e.g., frame rate). In some examples, charge level sensor 126 may be configured with a battery level threshold. When a current charge level of battery 124 is above the battery level threshold, video data may be processed at a relatively high resolution. However, in some examples, when charge level sensor 126 detects that a charge level of battery 124 is below the battery level threshold, charge level sensor 126 may determine that destination device 116 should enter a power saving mode. Thus, charge level sensor 126 may notify communication interface 122 and/or video decoder 300, either of which may request lower resolution (spatial and/or temporal) video data from source device 102 and/or video encoder 200. In other examples, a battery level threshold and charge level sensor need not be provided, and instead, a user of destination device 116 may determine that a power saving mode should be performed, in which lower resolution (spatial and/or temporal) video data is requested.

In particular, destination device 116 may send a request for reduced resolution video data to source device 102 via computer-readable medium 110. For example, video decoder 300 may construct a video spatial resolution request (VSRR) message specifying a resolution change and send the VSRR message to video encoder 200 via communication interface 122. If video encoder 200 can adjust its encoding picture or region resolution, it may consider the received VSRR message for coding of future pictures. Destination device 116 may include the VSRR message in a payload-specific feedback message, e.g., of a Real-time Transport Control Protocol (RTCP) feedback message, e.g., as specified in Ott et al., "Extended RTP Profile for Real-time Transport Control Protocol (RTCP)-based Feedback (RTP/AVPF)," Network Working Group, RFC 4585, July 2006.

Destination device 116 may form the VSRR message to include content according to the syntax elements or fields discussed below to indicate the applicability of the requested picture resolution change and update. The syntax elements or fields may indicate VSRR types, e.g., as follows: a resolution or resolution change for pictures of one or multiple layers; a resolution or resolution change for pictures of one or multiple temporal layers of a specific layer; and/or a resolution or resolution change for pictures of a specific temporal layer across all layers. The VSRR message may include a syntax element or field to indicate the number of resolution changes specified in the VSRR message.

The VSRR message may include a syntax element or field to request cancelation of the resolution change request by any previous VSRR messages. The VSRR message may include a syntax element or field to request to restore the original picture resolution when a picture resolution is not present in the message. For example, if destination device 116 determines that a power source has been coupled to charging interface 128 (e.g., a universal serial bus (USB) interface), destination device 116 may determine that a normal power mode may be resumed, and therefore send a VSRR message indicating that higher resolution (e.g., the previous resolution) video data may be resumed.

In general, the reaction time of video encoder 200 may be significantly longer than the typical picture duration. Video encoder 200 may decide whether and to what extent the request from destination device 116 results in a change of the resolution or region. Video encoder 200 may return a video spatial resolution notification (VSRN) message to indicate the change that it will use henceforth.

Figure 2:
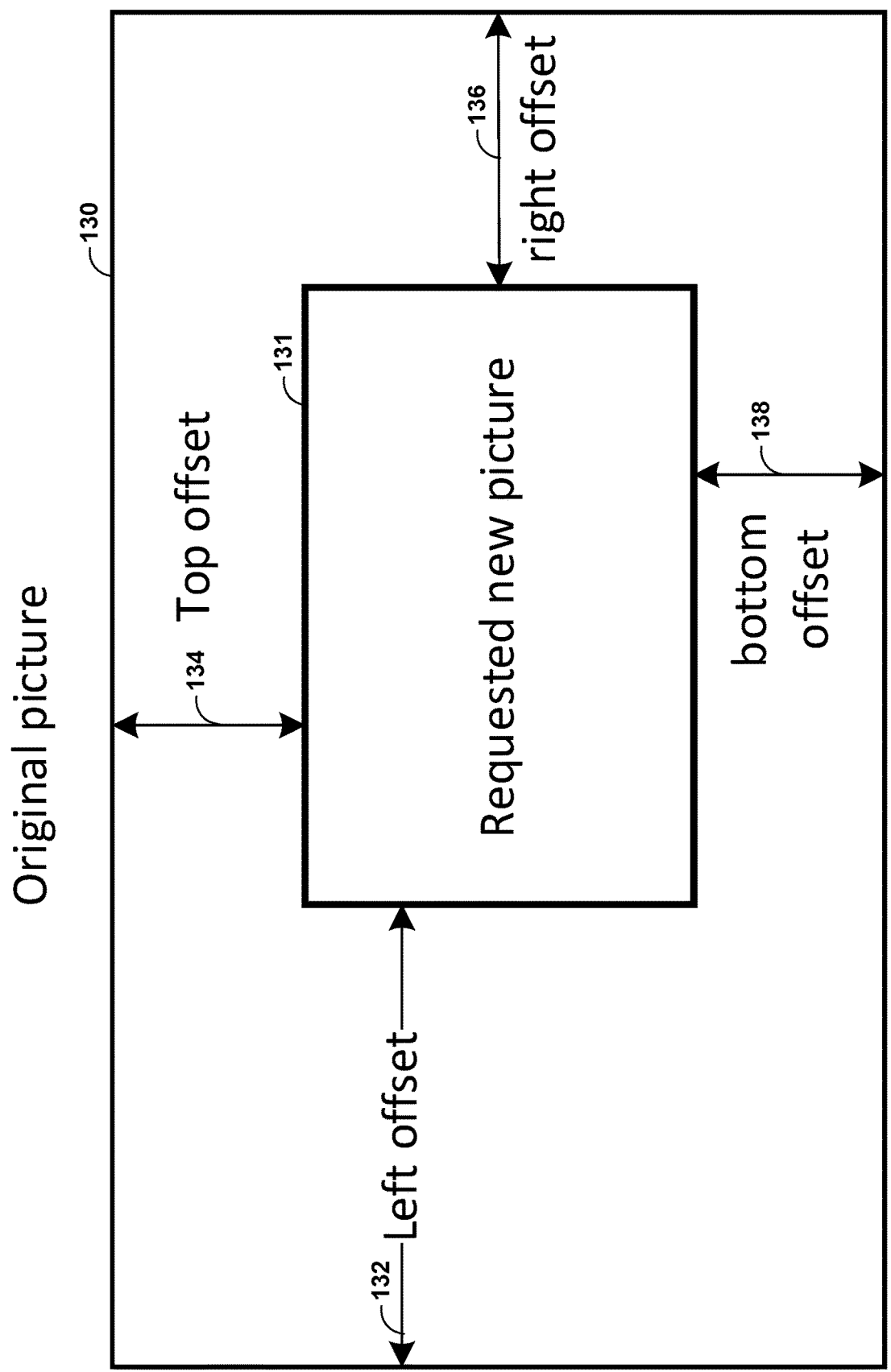
FIG. 2 is a conceptual diagram illustrating specifications of a resolution for a new picture of a coded video sequence.

FIG. 2 is a conceptual diagram illustrating specifications of a resolution for a new picture of a coded video sequence. In particular, FIG. 2 depicts original picture 130, requested new picture 131, left offset 132, top offset 134, right offset 136, and bottom offset 138. Destination device 116 may request that video encoder 200 encode a region of original picture 130 as a new picture. Destination device 116 may form a VSRR message to include syntax elements to indicate left offset 132, top offset 134, right offset 136, and bottom offset 138 to original picture 130 to form new picture 131. For a sub-picture based encoding process, destination device 116 may form the VSRR message to include syntax elements to indicate the subpicture identifiers (IDs) and request that video encoder 200 encode specific subpictures, instead of the entire picture.

Figure 3:
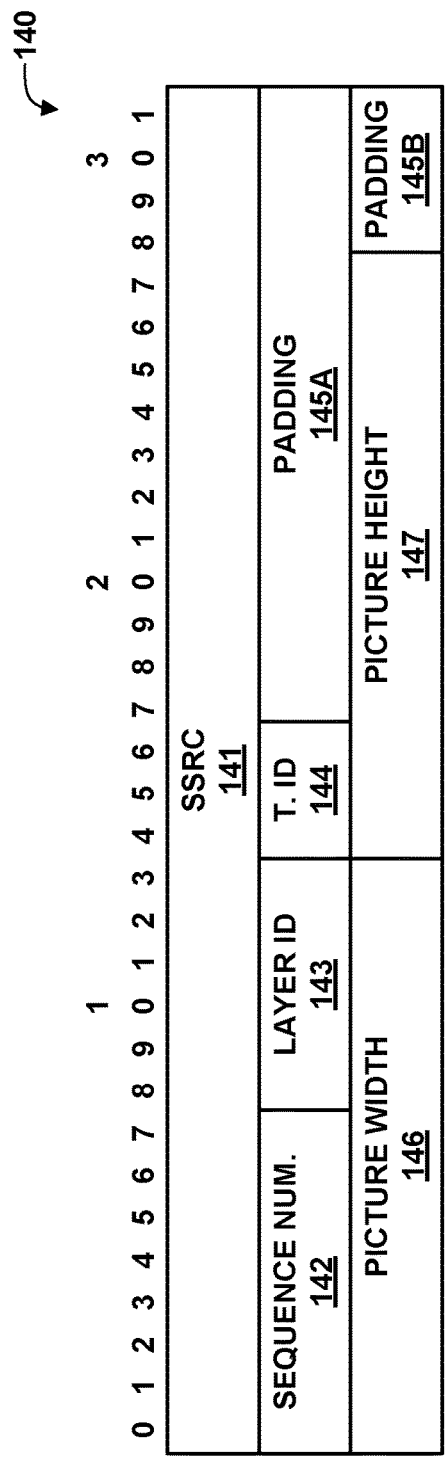
FIG. 3 is a conceptual diagram illustrating an example syntax structure for a video spatial resolution request (VSRR) resolution change message.

FIG. 3 is a conceptual diagram illustrating an example syntax structure for a video spatial resolution request (VSRR) resolution change message 140. In this example, VSRR resolution change message 140 includes synchronization source (SSRC) field 141, sequence number (sequence num.) field 142, layer identifier (layer ID.) field 143, temporal identifier (T. ID) field 144, padding fields 145A, 145B, picture width field 146, and picture height field 147. Picture width field 146 and picture height field 147 may be referred to as the payload of VSRR resolution change message 140.

In this example, SSRC field 141 may represent a synchronization source of the video spatial resolution request (VSRR) that initiated the request. The payload of VSRR resolution change message 140 carries data representative of a requested picture width (in picture width field 146) and picture height (in picture height field 147) applicable to pictures of specific temporal layers (specified in layer ID field 143) and temporal layers (specified in temporal ID field 144). VSRR resolution change message 140 may contain a field control information (FCI) field containing one or more VSRR FCI entries.

Sequence number field 142 may be an 8-bit field that includes a packet sequence number of a request. Layer ID field 143 includes an identifier of a video layer (e.g., for multi-layer video coding, such as scalable video coding or multi-view video coding). When the value of layer ID field 143 is equal to 0x3F, the associated resolution change may apply to all layers (e.g., all scalable layers or all views). Temporal ID field 144 may indicate the identifier of a corresponding temporal layer. When the value of temporal ID field 144 is equal to 0x7, the associated resolution change may apply to all temporal layers.

Picture width field 146 and picture height field 147 may be respective 14 bit fields. These fields may have values indicating the target picture resolution applied to associated scalable layers, views, and/or temporal layers.

In particular, video decoder 300 may form VSRR resolution change message 140 to request a new spatial resolution for subsequent pictures of a video bitstream. Video decoder 300 may specify specific spatial or scalable layers or views in layer ID field 143 or temporal layers in T. ID field 144, a picture width in picture width field 146 and a picture height in picture height field 147. Video decoder 300 may form an FCI including multiple such VSRR resolution change messages for different spatial/scalable and/or temporal layers to request different resolutions for the various spatial/scalable and/or temporal layers.

Video encoder 200 may determine a requested width for subsequently encoded pictures from the value of picture width field 146 and a requested height for the subsequently encoded pictures from picture height field 147. Similarly, video encoder 200 may determine the requested subsequently encoded pictures as being in a particular spatial and/or scalable layers, views, and/or temporal layers (or all of such layers) from the values of layer ID field 143 and T. ID 144. In some examples, video encoder 200 may receive multiple VSSR resolution change messages including different resolution change requests for different sets of spatial/scalable and/or temporal layers. Video encoder 200 may thus determine whether to modify the resolutions for the various layers (or all layers) as requested. In response to determining to modify the resolutions, video encoder 200 may encode subsequent pictures according to the requested resolution change.

Padding fields 145A, 145B may include all zero values for padding to produce doubleword-alignment for VSRR resolution change message 140. Video decoder 300 may set the values of padding fields 145A, 145B to zero. Video encoder 200 may ignore the values of padding fields 145A, 145B.

Figure 4:
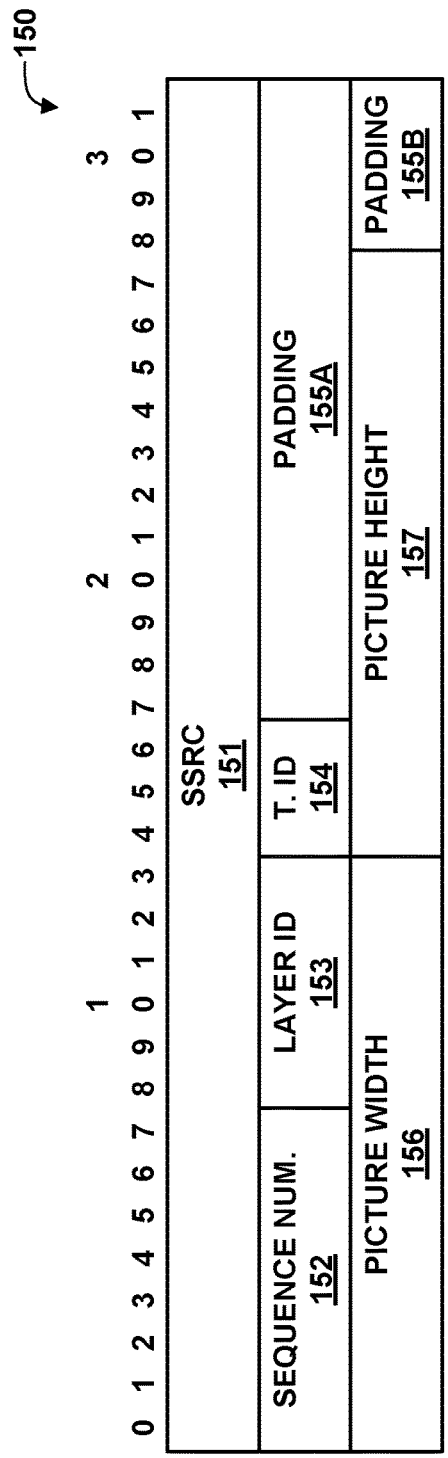
FIG. 4 is a conceptual diagram of an example syntax structure for a video spatial resolution notification (VSRN) message corresponding to a VSRR resolution change message.

FIG. 4 is a conceptual diagram of an example syntax structure for a video spatial resolution notification (VSRN) message 150 corresponding to a VSRR resolution change message (such as VSRR resolution change message 140). Video encoder 200 and/or source device 102 may prepare VSRN message 150 in response to receiving VSRR resolution change message 140 from destination device 116/video decoder 300. Video encoder 200/source device 102 may prepare VSRN message 150 to indicate the resolution video encoder 200 will use for one or more subsequent pictures of the bitstream. Video encoder 200/source device 102 may prepare an FCI field including one or more VSRN FCI entries. VSRN message 150 represents example contents of an FCI entry for a VSRN message (i.e., a VSRN FCI entry).

In the example of FIG. 4, VSRN message 150 includes synchronization source (SSRC) field 151, sequence number (sequence num.) field 152, layer identifier (layer ID.) field 153, temporal identifier (T. ID) field 154, padding fields 155A, 155B, picture width field 156, and picture height field 157. In this example, SSRC field 151 is a 32 bit field specifying the SSRC of the source of the video spatial resolution notification (VSRN) that resulted in VSRN message 150. In this example, sequence number (num.) field 152 is an eight bit field that specifies the sequence number value from the VSRR that is being acknowledged (e.g., the sequence number specified in sequence num. field 142 of corresponding VSRR resolution change message 140).

In this example, layer identifier (layer ID) field 153 is a six bit field that specifies an identifier of a layer associated with the resolution change. A value of 0x3F for layer ID field 153 equal to 0x3F (i.e., 111111 in binary) may indicate that the resolution change applies to all layers of a corresponding bitstream (e.g., all spatial and/or scalable layers, and/or views for multi-view video data). Temporal ID (T. ID) field 154 is a three-bit field including an identifier of a temporal layer associated with the resolution change. A value of T. ID field 154 equal to 0x7 (i.e., 111 in binary) may indicate that the resolution change applies to all temporal layers.

Padding fields 155A, 155B may include all zero values for padding to produce doubleword-alignment for VSRN message 150. Video encoder 200 may set the values of padding fields 155A, 155B to zero. Video decoder 300 may ignore the values of padding fields 155A, 155B.

Picture width field 156 and picture height field 157 may specify a size (a width and height, respectively) of pictures corresponding to the layers indicated in layer ID field 153 and temporal ID field 154. That is, video encoder 200 may specify the size of pictures in these layers using VSRN message 150, e.g., in response to VSRR resolution change message 140 from video decoder 300. Video decoder 300, in turn, may determine the size of pictures in the layers indicated in layer ID field 153 and temporal ID field 154 from the values of picture width field 156 and picture height field 157.

Figure 5:
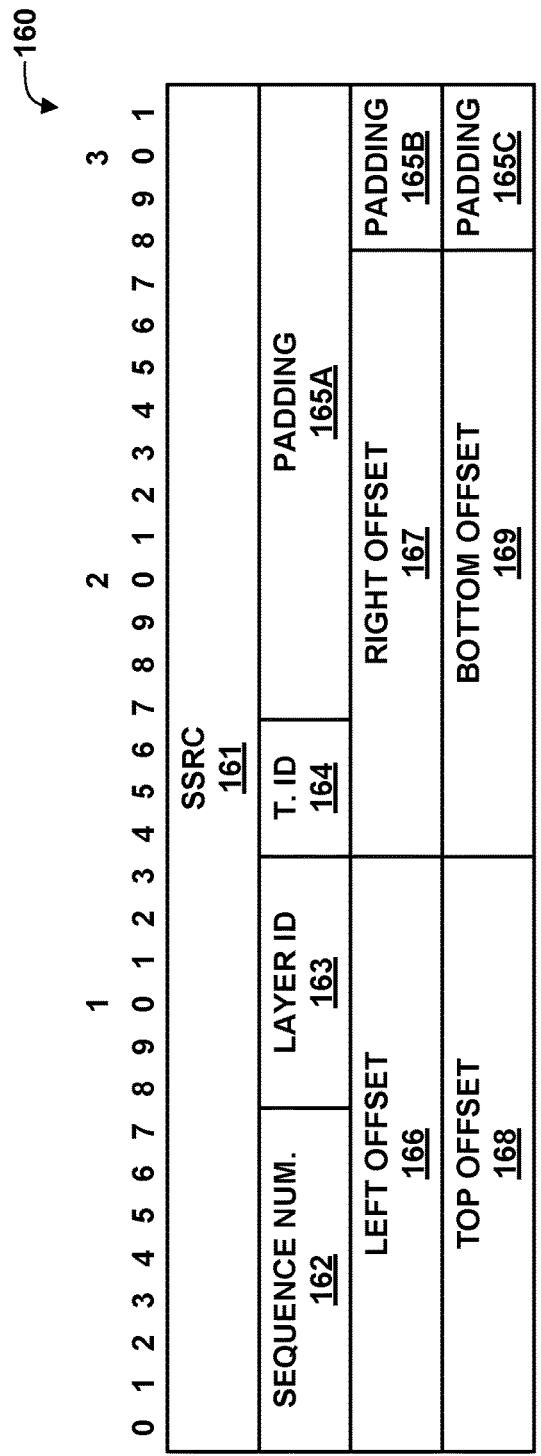
FIG. 5 is a conceptual diagram of an example syntax structure for a video spatial resolution request (VSRR) region encoding message.

FIG. 5 is a conceptual diagram of an example syntax structure for a video spatial resolution request (VSRR) region encoding message. In this example, VSRR region encoding message 160 includes synchronization source (SSRC) field 161, sequence number (sequence num.) field 162, layer identifier (layer ID.) field 163, temporal identifier (T. ID) field 164, padding fields 165A-165C (padding fields 165), left offset field 166, right offset field 167, top offset field 168, and bottom offset field 169.

In this example, SSRC field 161 may represent a synchronization source of the video spatial resolution request (VSRR) that initiated the request. The payload of VSRR region encoding message 160 carries data representative of a requested picture width (in left offset field 166 and right offset field 167) and picture height (in top offset field 168 and bottom offset field 169) applicable to pictures of specific temporal layers (specified in layer ID field 163) and temporal layers (specified in temporal ID field 164). A field control information (FCI) field may contain one or more VSRR FCI entries corresponding to VSRR region encoding message 160.

Sequence number field 162 may be an 8-bit field that includes a packet sequence number of a request. Layer ID field 163 includes an identifier of a video layer (e.g., for multi-layer video coding, such as scalable video coding or multi-view video coding). When the value of layer ID field 163 is equal to 0x3F, the associated region encoding may apply to all layers (e.g., all scalable layers or all views). Temporal ID field 164 may indicate the identifier of a corresponding temporal layer. When the value of temporal ID field 164 is equal to 0x7, the associated region encoding may apply to all temporal layers.

Padding fields 165 may include all zero values for padding to produce doubleword-alignment for VSRR region encoding message 160. Video decoder 300 may set the values of padding fields 165 to zero. Video encoder 200 may ignore the values of padding fields 165.

Left offset field 166, right offset field 167, top offset field 168, and bottom offset field 169 in this example are 14-bit fields that specify respective left, right, top, and bottom offsets to indicate a region of subsequent pictures to be encoded, relative to a previous picture. For example, the previous picture may correspond to original picture 130 of FIG. 2, and the subsequent picture(s) may correspond to requested new picture 131 of FIG. 2. Requested new picture 131 may be specified using offsets relative to original picture 130. For example, a value for left offset 132 may be specified in left offset field 166, a value for right offset 136 may be specified in right offset field 167, a value for top offset 134 may be specified in top offset field 168, and a value for bottom offset 138 may be specified in bottom offset field 169. VSRR region encoding message 160 may request region encoding for all pictures or only for pictures of specific spatial/scalable layers, views, and/or temporal layers.

In particular, video decoder 300 may form VSRR region encoding message 160 to specify a region of one or more subsequent pictures, relative to a previous picture, to be encoded by video encoder 200 (of the specified layers). Video encoder 200 may, in turn, use VSRR region encoding message 160 to determine the requested region to be encoded. Accordingly, rather than encoding a full picture, video encoder 200 may instead encode only the requested region for the specified layers. For example, video decoder 300 may specify a region of interest to be encoded in subsequent pictures of the specified layers.

Figure 6:
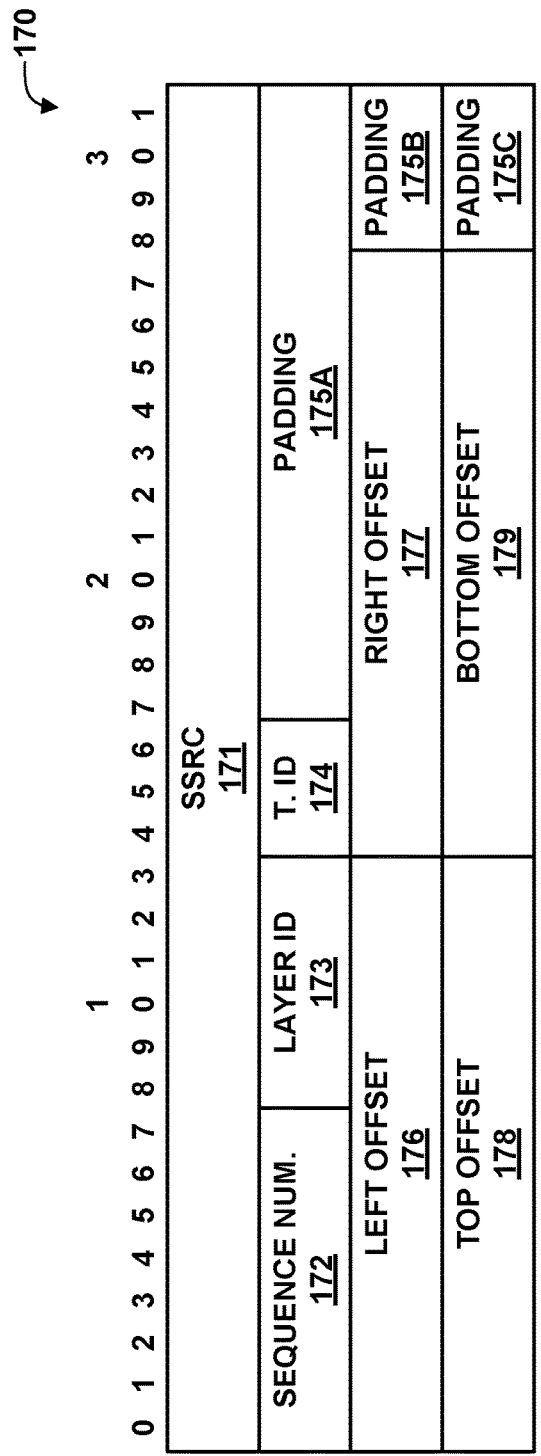
FIG. 6 is a conceptual diagram of an example syntax structure for a video spatial resolution notification (VSRN) message corresponding to a VSRR region encoding message.

FIG. 6 is a conceptual diagram of an example syntax structure for a video spatial resolution notification (VSRN) message 170 corresponding to a VSRR region encoding message. Video encoder 200 and/or source device 102 may prepare VSRN message 170 in response to receiving VSRR region encoding message 160 from destination device 116/video decoder 300. Video encoder 200/source device 102 may prepare VSRN message 170 to indicate a region of a picture (relative to an original picture) that video encoder 200 will encode for one or more subsequent pictures of the bitstream. Video encoder 200/source device 102 may prepare an FCI field including one or more VSRN FCI entries. VSRN message 170 represents example contents of an FCI entry for a VSRN message (i.e., a VSRN FCI entry).

In the example of FIG. 6, VSRN message 170 includes synchronization source (SSRC) field 171, sequence number (sequence num.) field 172, layer identifier (layer ID.) field 173, temporal identifier (T. ID) field 174, padding fields 175A-175C (padding fields 175), left offset field 176, right offset field 177, top offset field 178, and bottom offset field 179. In this example, SSRC field 171 is a 32 bit field specifying the SSRC of the source of the video spatial resolution notification (VSRN) that resulted in VSRN message 170. In this example, sequence number (num.) field 172 is an eight bit field that specifies the sequence number value from the VSRR that is being acknowledged (e.g., the sequence number specified in sequence num. field 162 of corresponding VSRR region encoding message 160).

In this example, layer identifier (layer ID) field 173 is a six bit field that specifies an identifier of a layer associated with the resolution change. A value of 0x3F for layer ID field 173 equal to 0x3F (i.e., 111111 in binary) may indicate that the resolution change applies to all layers of a corresponding bitstream (e.g., all spatial and/or scalable layers, and/or views for multi-view video data). Temporal ID (T. ID) field 174 is a three-bit field including an identifier of a temporal layer associated with the resolution change. A value of T. ID field 174 equal to 0x7 (i.e., 111 in binary) may indicate that the resolution change applies to all temporal layers.

Padding fields 175 may include all zero values for padding to produce doubleword-alignment for VSRN message 170. Video encoder 200 may set the values of padding fields 175 to zero. Video decoder 300 may ignore the values of padding fields 175.

Left offset field 176, right offset field 177, top offset field 178, and bottom offset field 179 in this example are 14-bit fields that specify respective left, right, top, and bottom offsets to indicate a region of subsequent pictures to be encoded, relative to a previous picture. For example, the previous picture may correspond to original picture 130 of FIG. 2, and the subsequent picture(s) may correspond to requested new picture 131 of FIG. 2. Requested new picture 131 may be specified using offsets relative to original picture 130. For example, a value for left offset 132 may be specified in left offset field 176, a value for right offset 136 may be specified in right offset field 177, a value for top offset 134 may be specified in top offset field 178, and a value for bottom offset 138 may be specified in bottom offset field 179.

In particular, video encoder 300 may form VSRN message 170 to specify a region of one or more subsequent pictures, relative to a previous picture, that will be encoded by video encoder 200 for the corresponding specified layers. Video decoder 300 may, in turn, use VSRN message 170 to determine the region that will be encoded of the specified layers. Accordingly, video decoder 300 may receive encoded pictures corresponding to the specified region. Video decoder 300 may decode the pictures and construct full decoded pictures, e.g., by replicating portions of the original picture outside of the encoded region and by updating the specified region using decoded data of the pictures. In this manner, rather than encoding and decoding a full picture, video encoder 200 and video decoder 300 may encode/decode only the specified region of the specified layers.

Video encoder 200 may use VSRN message 170 to acknowledge reception of VSRR region encoding message 160 from video decoder 300. For each VSRR region encoding message received and targeted at a session participant, video encoder 200 may send a corresponding VSRN FCI entry in a VSRN feedback message. A single VSRN message may acknowledge multiple requests using multiple FCI entries. The VSRN message contents may be different from the corresponding VSRR message. For example, video encoder 200 may not be able to adjust the resolution of a specific spatial layer or temporal layer, or pre-recorded content may be used.

Figure 7:
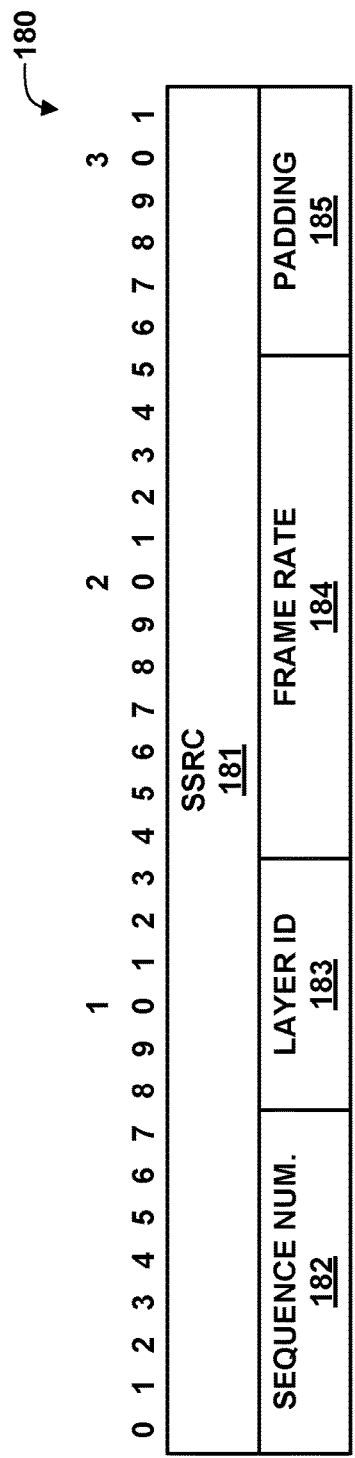
FIG. 7 is a conceptual diagram of an example syntax structure for a video temporal resolution request (VTRR) message.

FIG. 7 is a conceptual diagram of an example syntax structure for a video temporal resolution request (VTRR) message 180. In this example, VTRR message 180 includes synchronization source (SSRC) field 181, sequence number (sequence num.) field 182, layer identifier (layer ID.) field 183, frame rate field 184, and padding field 185. SSRC field 181 may represent a synchronization source of the temporal-spatial tradeoff request (TSTR) that initiated the request. The payload of VTRR region encoding message 180 carries data representative of a requested frame rate in frame rate field 184 applicable to pictures of specific temporal layers (specified in layer ID field 183). A field control information (FCI) field may contain one or more VTRR FCI entries corresponding to VTRR region encoding message 180.

Padding field 185 may be a 6-bit field set to all zero values. That is, video decoder 300 may form VTRR message 180 to include six zero-valued bits in padding field 185. Video encoder 200 may ignore the values of padding field 185.

Video decoder 300 may use VTRR message 180 to instruct or request that video encoder 200 change its coding frame rate. Video decoder 300 may explicitly signal in VTRR message 180 the requested frame rate of the coding pictures of specified temporal or spatial layer (e.g., specified in layer ID field 183). Alternatively, video decoder 300 may express in VTRR message 180 a frame rate decrease or increment percentage of the original frame rate.

Video decoder 300 may suggest a frame rate change by sending VTRR message 180 to video encoder 200. If video encoder 200 can adjust its coding frame rate, video encoder 200 may consider the received VTRR message 180 for future coding of pictures. In general, video encoder 200 reaction time may be significantly longer than the typical picture duration.

FIG. 7 depicts an example VTRR content of an FCI entry. The payload of VTRR message 180 carries the picture frame rate (in frame rate field 184) applicable to pictures of specific temporal layers or scalable layers (in layer ID field 183). The FCI field may contain one or more VTRR FCI entries.

In some examples, video decoder 300 or destination device 116 may add fields similar to layer ID field 183 and frame rate field 184 to VSRR message 140 of FIG. 3 and/or to VSRR region encoding message 160. In this manner, video decoder 300 or destination device 116 may construct a single message to request both a reduced spatial resolution and a reduced temporal resolution (frame rate). Alternatively, video decoder 300 or destination device 116 may send two separate messages to reduce both the frame rate and the spatial resolution.

Figure 8:
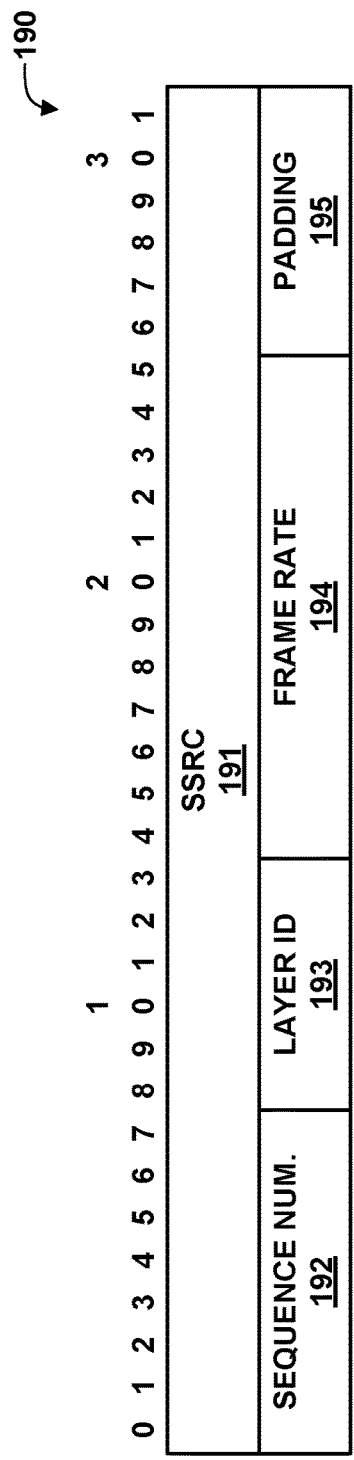
FIG. 8 is a conceptual diagram of an example syntax structure for a video temporal resolution notification (VSRN) message corresponding to a VTRR request message.

FIG. 8 is a conceptual diagram of an example syntax structure for a video temporal resolution notification (VTRN) message 190 corresponding to a VTRR message, such as VTRR message 180 of FIG. 7. Video encoder 200 may return VTRN message 190 in response to VTRR message 180 to indicate the changed frame rate that video encoder 200 will use henceforth. Video encoder 200 may decide whether and to what extent the request of VTRN message 190 results in a change of the frame rate.

In this example, VTRN message 190 includes synchronization source (SSRC) field 191, sequence number (sequence num.) field 192, layer identifier (layer ID.) field 193, frame rate field 194, and padding field 195. In this example, SSRC field 191 is a 32 bit field specifying the SSRC of the source of the video temporal resolution request (VTRR) that resulted in VTRN message 190. In this example, sequence number (num.) field 192 is an eight bit field that specifies the sequence number value from the VTRR that is being acknowledged (e.g., the sequence number specified in sequence num. field 182 of corresponding VTRR message 180).

Layer ID field 193 may be a six bit field that indicates an identifier of the layer. When the value of layer ID field 193 is equal to 0x3F (that is, 111111), the associated frame rate specified in frame rate field 194 may apply to all scalable layers (or all temporal layers).

Frame rate field 194 indicates a target picture frame rate applied to one or more associated layers (e.g., scalable layers, spatial layers, views, or temporal layers). That is, video encoder 200 may set the value of frame rate field 194 to indicate a picture frame rate of the corresponding layers. Thus, video decoder 300 may determine the frame rate from frame rate field 194 for the corresponding layers.

Padding field 195 may be a six-bit field of all zeros. Video encoder 200 may set the value of padding field 195 to all zeros. Video decoder 300 may ignore the value of padding field 195.

In some examples, e.g., where video decoder 300 or destination device 118 requests both a reduced spatial resolution and a reduced temporal resolution (frame rate), video encoder or source device 102 may send a single message including both spatial resolution information (e.g., similar to that of VSRN message 150 or VSRN message 170) and VTRN message 190. In other examples, where video decoder 300 or destination device 118 requests both a reduced spatial resolution and a reduced temporal resolution (frame rate), video encoder or source device 102 may send separate VSRN and VTRN messages indicating the new, reduced spatial and temporal resolutions, respectively.

Figure 9:
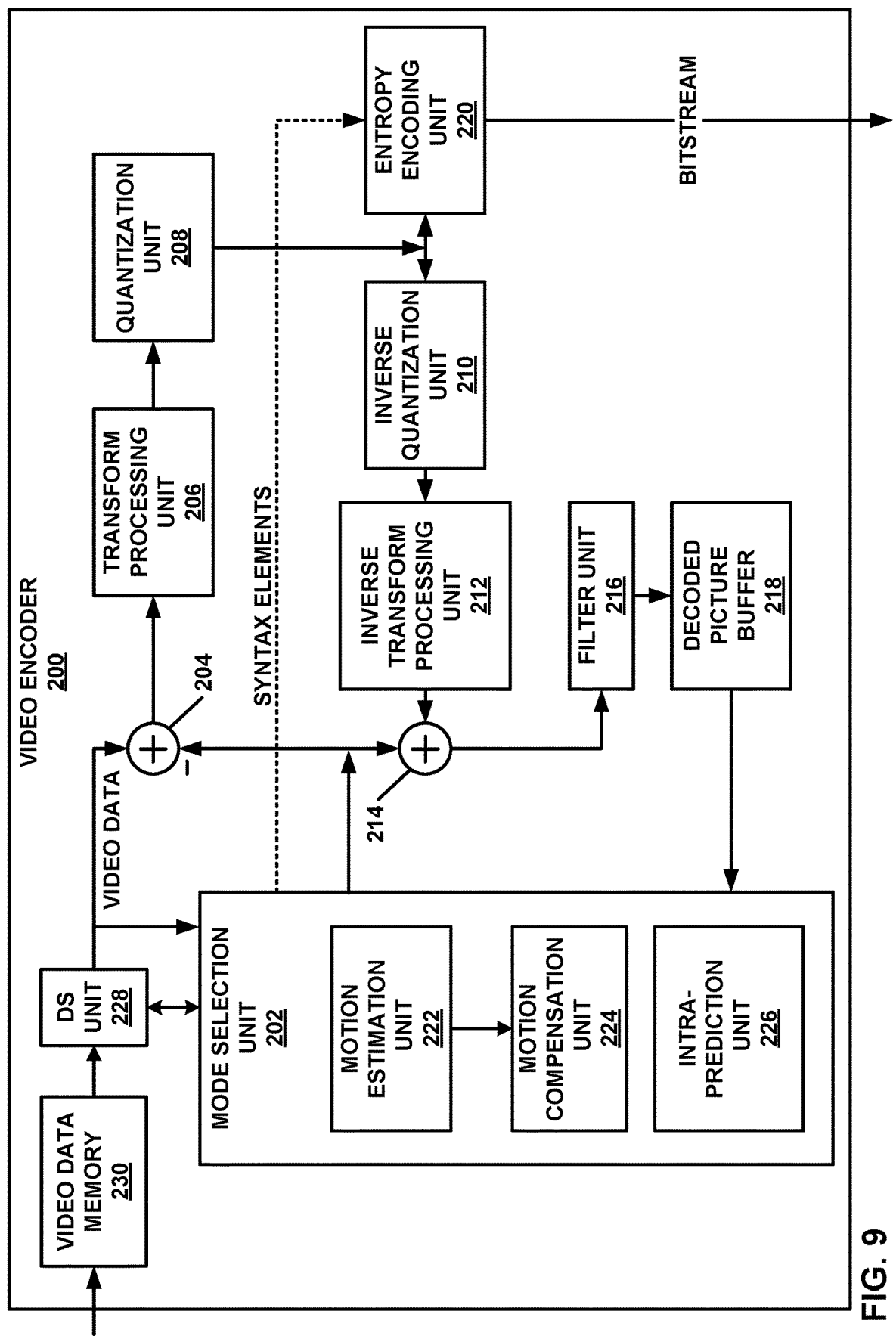
FIG. 9 is a block diagram illustrating an example video encoder that may perform video encoding and video decoding (or video reproduction).

FIG. 9 is a block diagram illustrating an example video encoder 200 that may perform the techniques of this disclosure. FIG. 9 is provided for purposes of explanation and should not be considered limiting of the techniques as broadly exemplified and described in this disclosure. For purposes of explanation, this disclosure describes video encoder 200 according to the techniques of VVC (ITU-T H.266) and HEVC (ITU-T H.265). However, the techniques of this disclosure may be performed by video encoding devices that are configured according to other video coding standards and video coding formats, such as AV1 and successors to the AV1 video coding format.

In the example of FIG. 9, video encoder 200 includes video data memory 230, downscale (DS) unit 228, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 9 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed.

For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

In accordance with the techniques of this disclosure, video encoder 200 may receive data indicating that video data is to be encoded with a reduced resolution relative to the original resolution of the raw video data stored in video data memory 230. The reduced resolution may be a reduced spatial resolution, a reduced temporal resolution, or both. Downscale (DS) unit 228 may perform spatial and/or temporal downscaling of the video data. For example, DS unit 228 may execute one or more decimation filters to reduce the spatial resolution of raw pictures to be encoded. As another example, DS unit 228 may extract a particular region of interest of raw pictures to be encoded, e.g., as discussed above with respect to FIG. 2.

Additionally or alternatively, DS unit 228 may determine temporal layer identifiers of pictures to be omitted from encoding. In general, a temporal layer identifier for a picture indicates that pictures of a corresponding temporal layer and lower temporal layers are needed to code pictures of the corresponding temporal layer. Thus, if a requested temporal layer is layer 3, pictures of temporal layers 0, 1, 2, and 3 would be provided. Various temporal layers may correspond to various frame rates, e.g., 15 frames per second (fps), 30 fps, 60 fps, and 120 fps for layers 0, 1, 2, and 3, respectively. As such, if raw video data can satisfy 120 fps at temporal layer 3, and a client device requests a reduced frame rate of 30 fps, DS unit may omit pictures at temporal layers 2 and 3 from being encoded, and instead only pass pictures at temporally layers 0 and 1 along for encoding. In cases where full resolution encoding is to be performed, DS unit 228 may pass all pictures at full spatial resolution from video data memory 230 along for encoding.

In some examples, mode selection unit 202 may determine temporal layers to which to assign raw pictures, and provide information indicating which temporal layer a picture is to be assigned to DS unit 228. For example, mode selection unit 202 may determine that a scene change has occurred at a particular picture, and therefore, that the picture should be encoded as an I-frame and assigned to temporal layer 0. Mode selection unit 202 may also assign other pictures following an I-frame to other temporal layers according to a picture encoding pattern, e.g., IPBB, IPPP, or the like.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure. superblock structure, or the quadtree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 22 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Figure 10:
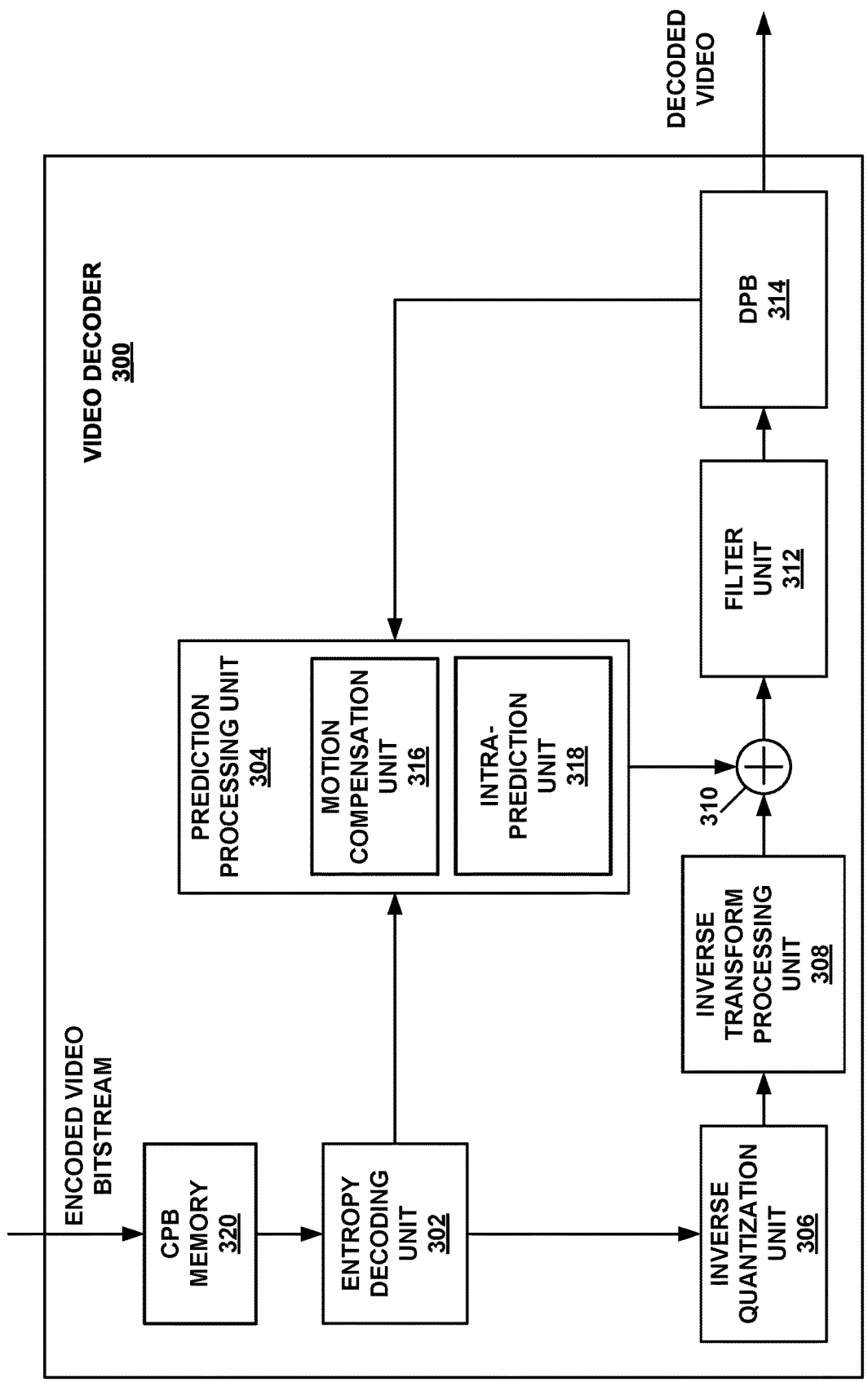
FIG. 10 is a block diagram illustrating an example video decoder that may perform video decoding.

FIG. 10 is a block diagram illustrating an example video decoder 300 that may perform the techniques of this disclosure. FIG. 10 is provided for purposes of explanation and is not limiting on the techniques as broadly exemplified and described in this disclosure. For purposes of explanation, this disclosure describes video decoder 300 according to the techniques of VVC (ITU-T H.266) and HEVC (ITU-T H.265). However, the techniques of this disclosure may be performed by video coding devices that are configured to other video coding standards.

In the example of FIG. 10, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, compensation unit 316 may be configured to decode coding blocks of video data (e.g., both luma and chroma coding blocks) using translational motion compensation, affine motion compensation, OBMC, and/or compound inter-intra prediction, as described above. Intra prediction unit 318 may be configured to decode coding blocks of video data (e.g., both luma and chroma coding blocks) using directional intra prediction, non-directional intra prediction, recursive filter intra prediction, CFL, intra block copy (IBC), and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 10 are illustrated to assist with understanding the operations performed by video decoder 300. The units may be implemented as fixed-function circuits, programmable circuits, or a combination thereof. Similar to FIG. 9, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 9).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 9). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

Figure 11:
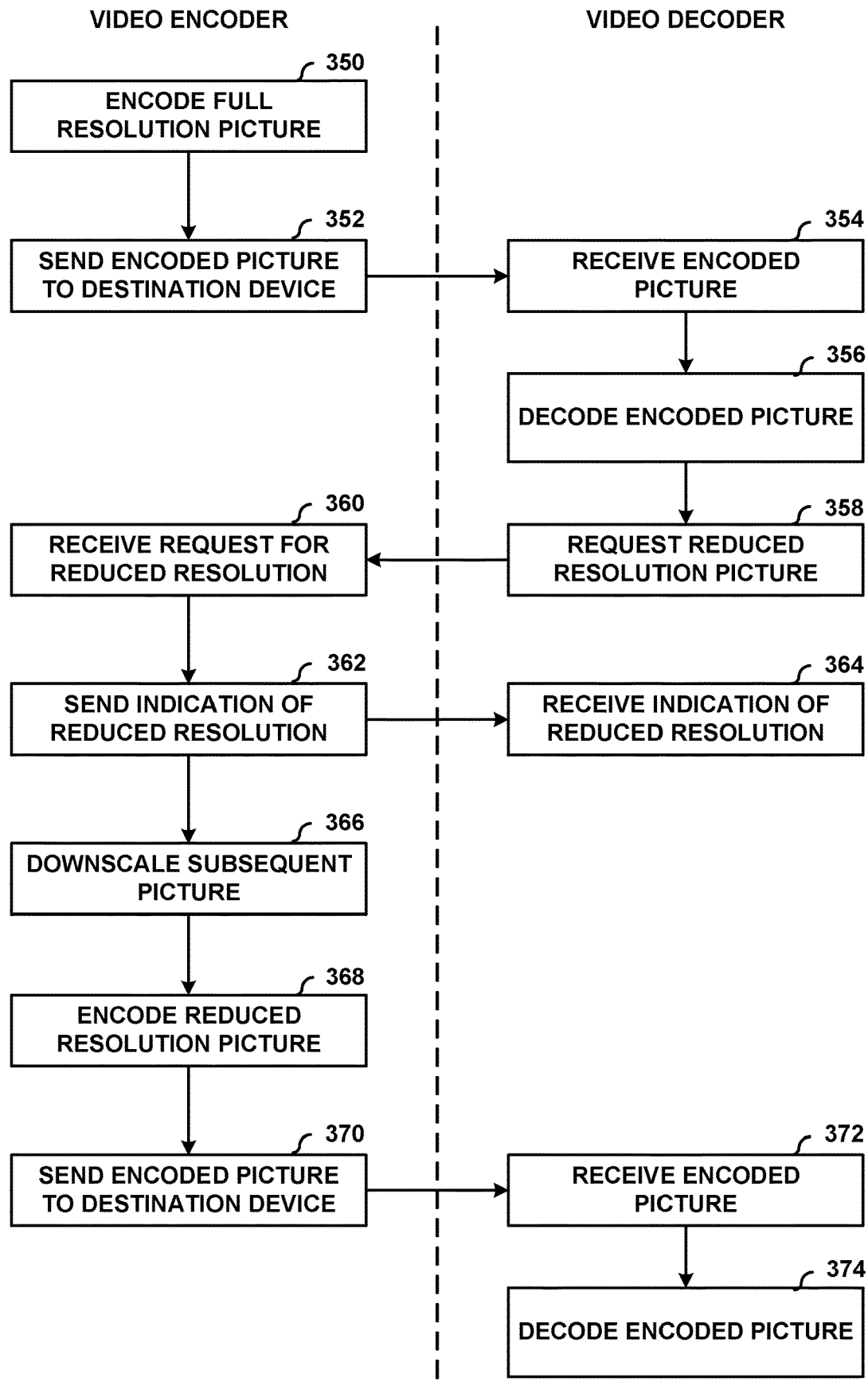
FIG. 11 is a flowchart illustrating an example method of requesting a new resolution for a picture according to the techniques of this disclosure.

FIG. 11 is a flowchart illustrating an example method of requesting a new resolution for a picture according to the techniques of this disclosure. The method of FIG. 11 is explained with respect to video encoder 200 and video decoder 300, although this method may also be performed by other devices or components, e.g., of source device 102 and destination device 116.

Initially, video encoder 200 encodes a full resolution picture (350). Video encoder 200 may send the encoded picture to destination device 116, and thus, video decoder 300 (352). Video decoder 300 may receive the encoded picture (354). Video decoder 300 may then decode the encoded picture (356). According to the techniques of this disclosure, video decoder 300 may request a reduced resolution picture (358) relative to the full resolution picture. Prior to requesting the reduced resolution picture, video decoder 300 (or destination device 116 of FIG. 1) may determine that destination device 116 is to enter a power saving mode. As part of the power saving mode, video decoder 300 may request reduced resolution video data, which may reduce power consumed by video decoder 300. Video decoder 300 may form a VSRR message, such as VSRR resolution change message 140 of FIG. 3, specifying a reduced size, such as a reduced width and/or height, of one or more subsequent pictures. The VSRR message may further specify a layer, such as a spatial layer, scalable layer, view, and/or temporal layer, including pictures for which the reduced size is being requested.

Video encoder 200 may receive the request for the reduced resolution (360). In response, video encoder 200 may send an indication of a reduced resolution for one or more subsequent pictures (362). The reduced resolution may be the requested reduced resolution or a different resolution. In this example, it is assumed that the reduced resolution is the requested reduced resolution. Video encoder 200 may send, for example, a VSRN message, such as VSRN message 150 of FIG. 4, indicating the reduced resolution. The VSRN message may further indicate layers including pictures for which the reduced resolution applies. Video decoder 300 may receive the indication (e.g., the VSRN message) of the reduced resolution (364).

Moreover, video encoder 200 may downscale a subsequent picture (366) to the reduced resolution. Video encoder 200 may also encode the reduced resolution picture (368). Video encoder 200 may then send the encoded picture to destination device 116, and thereby, video decoder 300 (370). Video decoder 300, in turn, may receive the encoded picture (372) and decode the encoded picture (374). Although not shown in FIG. 11, video decoder 300, or a post processing unit of destination device 116, may upsample the decoded picture to the full resolution prior to display.

In this manner, the method of FIG. 11 represents an example of a method for requesting reduced resolution video data including decoding, by a video decoder of a client device, a first sequence of pictures of a bitstream, the first sequence of pictures having a first resolution; in response to determining that the client device is to enter a power saving mode, sending, by the client device, a message requesting a reduced resolution relative to the first resolution for a second sequence of pictures, the second sequence of pictures being subsequent to the first sequence of pictures in coding order; and decoding, by the video decoder of the client device, the second sequence of pictures of the video data of the bitstream, the second sequence of pictures having the reduced resolution.

Figure 12:
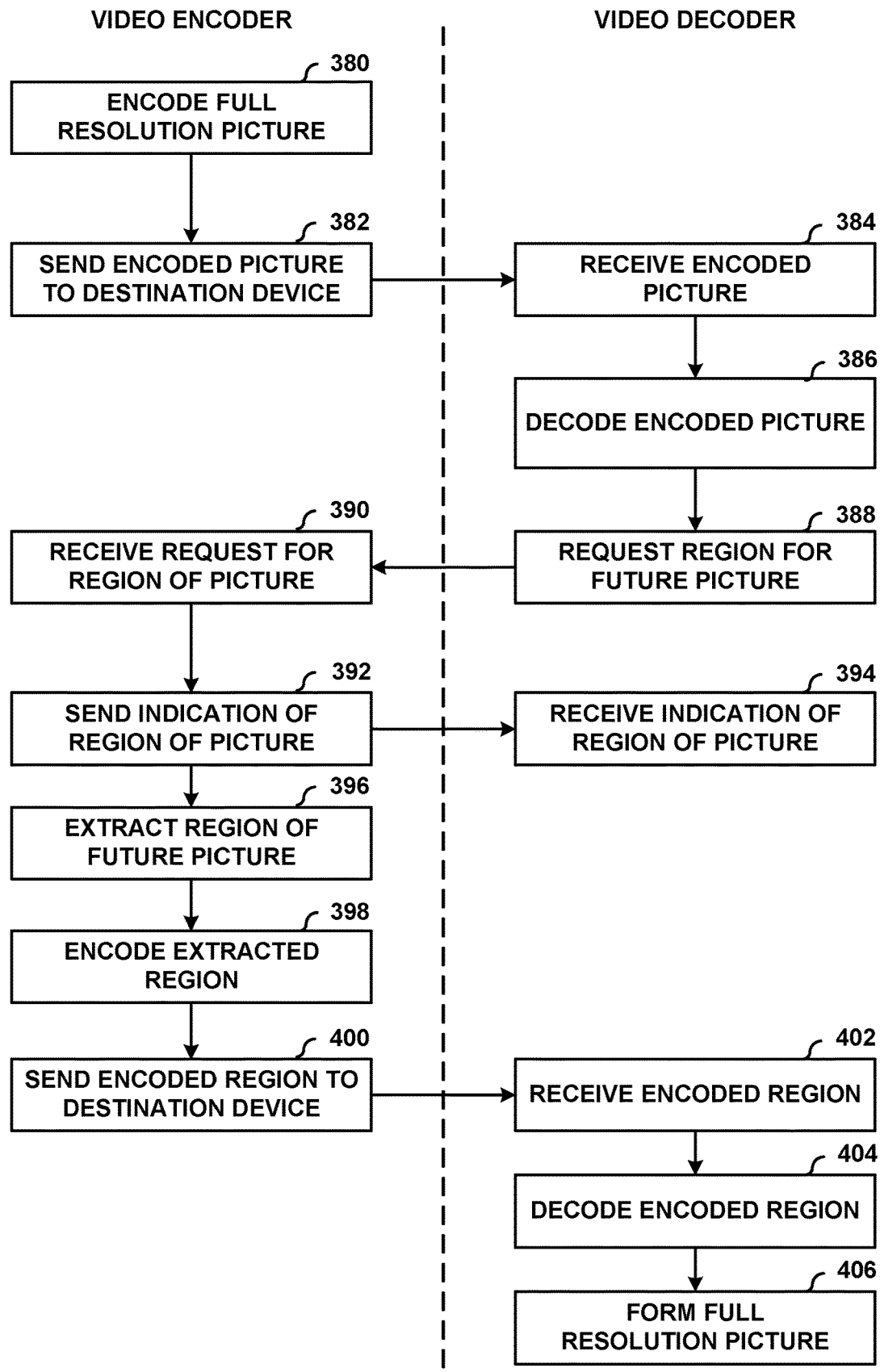
FIG. 12 is a flowchart illustrating an example method of requesting a region coding according to the techniques of this disclosure.

FIG. 12 is a flowchart illustrating an example method of requesting a region coding according to the techniques of this disclosure. The method of FIG. 12 is explained with respect to video encoder 200 and video decoder 300, although this method may also be performed by other devices or components, e.g., of source device 102 and destination device 116.

Initially, video encoder 200 encodes a full resolution picture (380). Video encoder 200 may send the encoded picture to destination device 116, and thus, video decoder 300 (382). Video decoder 300 may receive the encoded picture (384). Video decoder 300 may then decode the encoded picture (386). According to the techniques of this disclosure, video decoder 300 may request a region for a future picture (388) relative to the full resolution picture. Prior to requesting the reduced resolution picture, video decoder 300 (or destination device 116 of FIG. 1) may determine that destination device 116 is to enter a power saving mode. As part of the power saving mode, video decoder 300 may request reduced resolution video data, which may reduce power consumed by video decoder 300. Video decoder 300 may form a VSRR message, such as VSRR region encoding message 160 of FIG. 5, specifying a region of subsequent pictures relative to the first picture, e.g., using top, bottom, left, and right offsets. The VSRR message may further specify a layer, such as a spatial layer, scalable layer, view, and/or temporal layer, including pictures from which the region is being requested.

Video encoder 200 may receive the request for the region of the future picture (390). In response, video encoder 200 may send an indication of the region for one or more subsequent pictures (392). The actual region may be the requested region or a different region. In this example, it is assumed that the actual region is the requested region. Video encoder 200 may send, for example, a VSRN message, such as VSRN message 170 of FIG. 6, indicating the region. The VSRN message may further indicate layers including pictures for which the region extraction applies. Video decoder 300 may receive the indication (e.g., the VSRN message) of the region of the picture (394).

Moreover, video encoder 200 may extract the region from a subsequent picture (396). Video encoder 200 may also encode the extracted region (398). Video encoder 200 may then send the encoded region to destination device 116, and thereby, video decoder 300 (400). Video decoder 300, in turn, may receive the encoded region (402) and decode the encoded region (404). Furthermore, video decoder 300, or a post processing unit of destination device 116, may combine the decoded region with an exterior region of, e.g., the full resolution picture to form a full resolution picture (406).

In this manner, the method of FIG. 12 represents an example of a method for requesting reduced resolution video data including decoding, by a video decoder of a client device, a first sequence of pictures of a bitstream, the first sequence of pictures having a first resolution; in response to determining that the client device is to enter a power saving mode, sending, by the client device, a message requesting a reduced resolution relative to the first resolution for a second sequence of pictures, the second sequence of pictures being subsequent to the first sequence of pictures in coding order; and decoding, by the video decoder of the client device, the second sequence of pictures of the video data of the bitstream, the second sequence of pictures having the reduced resolution.

Figure 13:
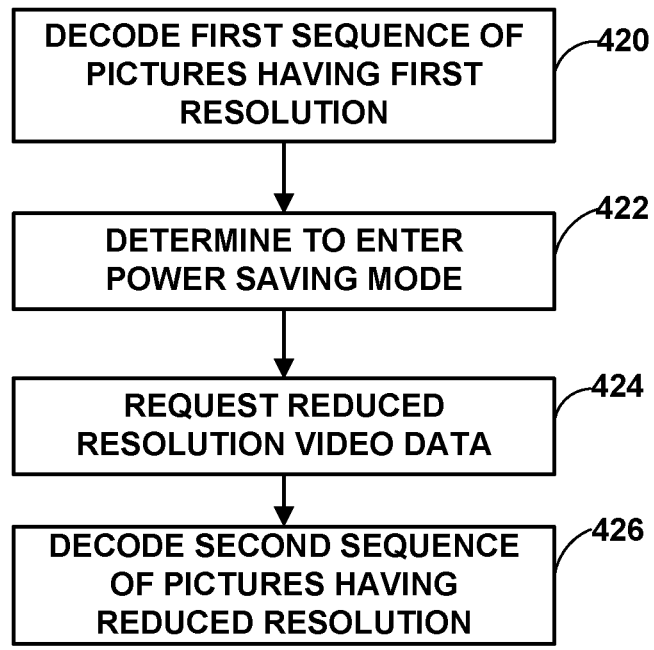
FIG. 13 is a flowchart illustrating an example method of requesting a reduced resolution for video data according to the techniques of this disclosure.

FIG. 13 is a flowchart illustrating an example method of requesting a reduced resolution for video data according to the techniques of this disclosure. The method of FIG. 13 is explained with respect to video encoder 200 and video decoder 300, although this method may also be performed by other devices or components, e.g., of destination device 116.

Initially, video decoder 300 may decode a first sequence of pictures having a first resolution (420). The first resolution may be a spatial resolution (e.g., 8K, 4K, 1080P, or the like), a temporal resolution (e.g., 240 fps, 120 fps, 60 fps, or the like), or both.

Video decoder 300 may then determine to enter a power saving mode (422). For example, a user may request to enter the power saving mode via a user interface of destination device 116. Additionally or alternatively, charge level sensor 126 of destination device 116 may determine that a battery charge level of battery 124 is lower than a threshold and automatically cause destination device 116 to enter the power saving mode.

As a result of entering the power saving mode, video decoder 300 (or another component of destination device 116, e.g., communication interface 122), may request reduced resolution video data (424) from source device 102. For example, video decoder 300 may construct a video spatial resolution request (VSRR) message (e.g., per FIG. 3) and/or a VSRR region encoding message to request a reduced spatial resolution picture. The reduced spatial resolution may be lower than the first resolution, e.g., 720p, 480p, or the like. As another example, video decoder 300 may construct a message requesting reduced temporal resolution, which may be less than the first resolution, e.g., 30 fps, 24 fps, 15 fps, or the like. In some examples, video decoder 300 may request both a reduced spatial resolution and a reduced temporal resolution. The requests for both the reduced spatial resolution and the reduced temporal resolution may be included in the same message or in two separate messages.

In response, video decoder 300 may receive reduced resolution video data, and video decoder 300 may decode a second sequence of pictures having the reduced resolution (426).

In this manner, the method of FIG. 13 represents an example of a method for requesting reduced resolution video data including decoding, by a video decoder of a client device, a first sequence of pictures of a bitstream, the first sequence of pictures having a first resolution; in response to determining that the client device is to enter a power saving mode, sending, by the client device, a message requesting a reduced resolution relative to the first resolution for a second sequence of pictures, the second sequence of pictures being subsequent to the first sequence of pictures in coding order; and decoding, by the video decoder of the client device, the second sequence of pictures of the video data of the bitstream, the second sequence of pictures having the reduced resolution.

Certain examples of the techniques of this disclosure are summarized in the following clauses:

Clause 1: A method of processing a picture size request for video data, the method comprising: coding a first picture of video data having a first size; processing a message specifying a reduced size relative to the first size for a second picture, the second picture being subsequent to the first picture in coding order; and coding the second picture of the video data having the reduced size.

Clause 2: The method of clause 1, wherein processing the message comprises processing a video spatial resolution request (VSRR) message specifying the reduced size.

Clause 3: The method of clause 2, wherein processing the VSRR message comprises processing a VSRR resolution change message including a picture width field specifying a requested width of the reduced size for the second picture and a picture height field specifying a requested height of the reduced size for the second picture.

Clause 4: The method of clause 2, wherein processing the VSRR message comprises processing a VSRR region encoding message including a top offset field specifying a requested offset for a top of the second picture relative to a top of the first picture, a bottom offset field specifying a requested offset for a bottom of the second picture relative to a bottom of the first picture, a left offset field specifying a requested offset for a left side of the second picture relative to a left side of the first picture, and a right offset field specifying a requested offset for a right side of the second picture relative to a right side of the first picture.

Clause 5: The method of any of clauses 2-4, further comprising processing a video spatial resolution notification (VSRN) message specifying the reduced size in response to the VSRR message.

Clause 6: The method of clause 5, wherein processing the VSRN message comprises processing the VSRN message in response to a video spatial resolution request (VSRR) resolution change message, wherein processing the VSRN message comprises processing a picture width field specifying a width of the reduced size for the second picture and a picture height field specifying a height of the reduced size for the second picture.

Clause 7: The method of clause 5, wherein processing the VSRN message comprises processing the VSRN message in response to a video spatial resolution request (VSRR) region encoding message, wherein processing the VSRN message comprises processing a top offset field specifying an offset for a top of the second picture relative to a top of the first picture, a bottom offset field specifying an offset for a bottom of the second picture relative to a bottom of the first picture, a left offset field specifying an offset for a left side of the second picture relative to a left side of the first picture, and a right offset field specifying an offset for a right side of the second picture relative to a right side of the first picture.

Clause 8: The method of clause 1, wherein processing the message comprises processing a video spatial resolution notification (VSRN) message specifying the reduced size.

Clause 9: The method of clause 8, wherein processing the VSRN message comprises processing the VSRN message in response to a video spatial resolution request (VSRR) resolution change message, wherein processing the VSRN message comprises processing a picture width field specifying a width of the reduced size for the second picture and a picture height field specifying a height of the reduced size for the second picture.

Clause 10: The method of clause 8, wherein processing the VSRN message comprises processing the VSRN message in response to a video spatial resolution request (VSRR) region encoding message, wherein processing the VSRN message comprises processing a top offset field specifying an offset for a top of the second picture relative to a top of the first picture, a bottom offset field specifying an offset for a bottom of the second picture relative to a bottom of the first picture, a left offset field specifying an offset for a left side of the second picture relative to a left side of the first picture, and a right offset field specifying an offset for a right side of the second picture relative to a right side of the first picture.

Clause 11: The method of any of clauses 1-10, wherein processing the message comprises forming the message.

Clause 12: The method of any of clauses 1-10, wherein processing the message comprises receiving the message.

Clause 13: The method of any of clauses 1-12, wherein coding the first picture comprises decoding the first picture, and wherein coding the second picture comprises decoding the second picture.

Clause 14: The method of clause 13, wherein processing the message comprises forming a video spatial resolution request (VSRR) message.

Clause 15: The method of clause 14, further comprising receiving a video spatial resolution notification (VSRN) message in response to the VSRR message, the VSRN message specifying the reduced size for the second picture.

Clause 16: The method of clause 14, further comprising receiving a video spatial resolution notification (VSRN) message in response to the VSRR message, the VSRN message specifying a third size for the second picture, the third size being less than the first size and different than the reduced size.

Clause 17: The method of any of clauses 1-16, wherein coding the first picture comprises encoding the first picture, and wherein coding the second picture comprises encoding the second picture.

Clause 18: The method of clause 17, further comprising receiving a video spatial resolution request (VSRR) message requesting the reduced size for the second picture, wherein processing the message comprises forming a video spatial resolution notification (VSRN) message in response to the VSRR message, the VSRN message specifying the reduced size for the second picture.

Clause 19: The method of clause 17, further comprising receiving a video spatial resolution request (VSRR) message requesting the reduced size for the second picture, wherein processing the message comprises forming a video spatial resolution notification (VSRN) message in response to the VSRR message, the VSRN message specifying a third size for the second picture, the third size being less than the first size and different than the reduced size.

Clause 20: The method of any of clauses 1-19, wherein the message specifies a layer of the video data including the second picture.

Clause 21: The method of clause 20, wherein the layer comprises a spatial layer, a scalable layer, or a view.

Clause 22: The method of clause 21, wherein processing the message comprises processing a layer identifier field specifying the layer.

Clause 23: The method of any of clauses 20-22, wherein the layer comprises a temporal layer.

Clause 24: The method of clause 23, wherein processing the message comprises processing a temporal layer identifier field specifying the temporal layer.

Clause 25: A method of processing a picture size request for video data, the method comprising: coding a first picture of video data having a first size; processing a message specifying a reduced size relative to the first size for a second picture, the second picture being subsequent to the first picture in coding order; and coding the second picture of the video data having the reduced size.

Clause 26: The method of clause 25, wherein processing the message comprises processing a video spatial resolution request (VSRR) message specifying the reduced size.

Clause 27: The method of clause 26, wherein processing the VSRR message comprises processing a VSRR resolution change message including a picture width field specifying a requested width of the reduced size for the second picture and a picture height field specifying a requested height of the reduced size for the second picture.

Clause 28: The method of clause 26, wherein processing the VSRR message comprises processing a VSRR region encoding message including a top offset field specifying a requested offset for a top of the second picture relative to a top of the first picture, a bottom offset field specifying a requested offset for a bottom of the second picture relative to a bottom of the first picture, a left offset field specifying a requested offset for a left side of the second picture relative to a left side of the first picture, and a right offset field specifying a requested offset for a right side of the second picture relative to a right side of the first picture.

Clause 29: The method of clause 26, further comprising processing a video spatial resolution notification (VSRN) message specifying the reduced size in response to the VSRR message.

Clause 30: The method of clause 29, wherein processing the VSRN message comprises processing the VSRN message in response to a video spatial resolution request (VSRR) resolution change message, wherein processing the VSRN message comprises processing a picture width field specifying a width of the reduced size for the second picture and a picture height field specifying a height of the reduced size for the second picture.

Clause 31: The method of clause 29, wherein processing the VSRN message comprises processing the VSRN message in response to a video spatial resolution request (VSRR) region encoding message, wherein processing the VSRN message comprises processing a top offset field specifying an offset for a top of the second picture relative to a top of the first picture, a bottom offset field specifying an offset for a bottom of the second picture relative to a bottom of the first picture, a left offset field specifying an offset for a left side of the second picture relative to a left side of the first picture, and a right offset field specifying an offset for a right side of the second picture relative to a right side of the first picture.

Clause 32: The method of clause 25, wherein processing the message comprises processing a video spatial resolution notification (VSRN) message specifying the reduced size.

Clause 33: The method of clause 32, wherein processing the VSRN message comprises processing the VSRN message in response to a video spatial resolution request (VSRR) resolution change message, wherein processing the VSRN message comprises processing a picture width field specifying a width of the reduced size for the second picture and a picture height field specifying a height of the reduced size for the second picture.

Clause 34: The method of clause 32, wherein processing the VSRN message comprises processing the VSRN message in response to a video spatial resolution request (VSRR) region encoding message, wherein processing the VSRN message comprises processing a top offset field specifying an offset for a top of the second picture relative to a top of the first picture, a bottom offset field specifying an offset for a bottom of the second picture relative to a bottom of the first picture, a left offset field specifying an offset for a left side of the second picture relative to a left side of the first picture, and a right offset field specifying an offset for a right side of the second picture relative to a right side of the first picture.

Clause 35: The method of clause 25, wherein processing the message comprises forming the message.

Clause 36: The method of clause 25, wherein processing the message comprises receiving the message.

Clause 37: The method of clause 25, wherein coding the first picture comprises decoding the first picture, and wherein coding the second picture comprises decoding the second picture.

Clause 38: The method of clause 37, wherein processing the message comprises forming a video spatial resolution request (VSRR) message.

Clause 39: The method of clause 38, further comprising receiving a video spatial resolution notification (VSRN) message in response to the VSRR message, the VSRN message specifying the reduced size for the second picture.

Clause 40: The method of clause 38, further comprising receiving a video spatial resolution notification (VSRN) message in response to the VSRR message, the VSRN message specifying a third size for the second picture, the third size being less than the first size and different than the reduced size.

Clause 41: The method of clause 25, wherein coding the first picture comprises encoding the first picture, and wherein coding the second picture comprises encoding the second picture.

Clause 42: The method of clause 41, further comprising receiving a video spatial resolution request (VSRR) message requesting the reduced size for the second picture, wherein processing the message comprises forming a video spatial resolution notification (VSRN) message in response to the VSRR message, the VSRN message specifying the reduced size for the second picture.

Clause 43: The method of clause 41, further comprising receiving a video spatial resolution request (VSRR) message requesting the reduced size for the second picture, wherein processing the message comprises forming a video spatial resolution notification (VSRN) message in response to the VSRR message, the VSRN message specifying a third size for the second picture, the third size being less than the first size and different than the reduced size.

Clause 44: The method of clause 25, wherein the message specifies a layer of the video data including the second picture.

Clause 45: The method of clause 44, wherein the layer comprises a spatial layer, a scalable layer, or a view.

Clause 46: The method of clause 45, wherein processing the message comprises processing a layer identifier field specifying the layer.

Clause 47: The method of clause 44, wherein the layer comprises a temporal layer.

Clause 48: The method of clause 47, wherein processing the message comprises processing a temporal layer identifier field specifying the temporal layer.

Clause 49: A method of processing a frame rate request for video data, the method comprising: coding a first plurality of pictures of video data having a first frame rate; processing a message specifying a reduced frame rate relative to the first frame rate for a second plurality of pictures, the second plurality of pictures being subsequent to the first plurality of pictures in coding order; and coding the second plurality of pictures of the video data having the reduced frame rate.

Clause 50: The method of clause 49, wherein the message comprises a video temporal resolution request (VTRR) message requesting the reduced frame rate.

Clause 51: The method of clause 49, wherein the message comprises a video temporal resolution notification (VTRR) message specifying the reduced frame rate.

Clause 52: The method of any of clauses 49-51, wherein processing the message comprises receiving the message.

Clause 53: The method of any of clauses 49-51, wherein processing the message comprises forming and sending the message.

Clause 54: The method of any of clauses 49-53, wherein coding the first plurality of pictures comprises decoding the first plurality of pictures, and wherein coding the second plurality of pictures comprises decoding the second plurality of pictures.

Clause 55: The method of any of clauses 49-53, wherein coding the first plurality of pictures comprises encoding the first plurality of pictures, and wherein coding the second plurality of pictures comprises encoding the second plurality of pictures.

Clause 56: A method of processing a frame rate request for video data, the method comprising: coding a first plurality of pictures of video data having a first frame rate; processing a message specifying a reduced frame rate relative to the first frame rate for a second plurality of pictures, the second plurality of pictures being subsequent to the first plurality of pictures in coding order; and coding the second plurality of pictures of the video data having the reduced frame rate.

Clause 57: The method of clause 56, wherein the message comprises a video temporal resolution request (VTRR) message requesting the reduced frame rate.

Clause 58: The method of clause 56, wherein the message comprises a video temporal resolution notification (VTRR) message specifying the reduced frame rate.

Clause 59: The method of clause 56, wherein processing the message comprises receiving the message.

Clause 60: The method of clause 56, wherein processing the message comprises forming and sending the message.

Clause 61: The method of clause 56, wherein coding the first plurality of pictures comprises decoding the first plurality of pictures, and wherein coding the second plurality of pictures comprises decoding the second plurality of pictures.

Clause 62: The method of clause 56, wherein coding the first plurality of pictures comprises encoding the first plurality of pictures, and wherein coding the second plurality of pictures comprises encoding the second plurality of pictures.

Clause 63: A device for processing a picture size request for video data, the device comprising one or more means for performing the method of any of clauses 1-62.

Clause 64: The device of clause 63, further comprising a display configured to display decoded video data.

Clause 65: The device of any of clauses 63 and 64, wherein the device comprises one or more of a camera, a computer, a mobile device, a broadcast receiver device, or a set-top box.

Clause 66: The device of clause 63-65, further comprising a memory configured to store the video data.

Clause 67: A computer-readable storage medium having stored thereon instructions that, when executed, cause a processor to perform the method of any of clauses 1-62.

Clause 68: A device for processing a picture size request for video data, the device comprising: means for coding a first picture of video data having a first size; means for processing a message specifying a reduced size relative to the first size for a second picture, the second picture being subsequent to the first picture in coding order; and means for coding the second picture of the video data having the reduced size.

Clause 69: A device for processing a frame rate request for video data, the device comprising: means for coding a first plurality of pictures of video data having a first frame rate; means for processing a message specifying a reduced frame rate relative to the first frame rate for a second plurality of pictures, the second plurality of pictures being subsequent to the first plurality of pictures in coding order; and means for coding the second plurality of pictures of the video data having the reduced frame rate.

Clause 70: A method of requesting a reduced resolution for video data, the method comprising: decoding, by a video decoder of a client device, a first sequence of pictures of a bitstream, the first sequence of pictures having a first resolution; in response to determining that the client device is to enter a power saving mode, sending, by the client device, a message requesting a reduced resolution relative to the first resolution for a second sequence of pictures, the second sequence of pictures being subsequent to the first sequence of pictures in coding order; and decoding, by the video decoder of the client device, the second sequence of pictures of the video data of the bitstream, the second sequence of pictures having the reduced resolution.

Clause 71: The method of clause 70, wherein the first resolution comprises a first spatial resolution for pictures in the first sequence of pictures, and the reduced resolution comprises a second, reduced spatial resolution for pictures in the second sequence of pictures.

Clause 72: The method of clause 71, further comprising forming the message as a video spatial resolution request (VSRR) message specifying the reduced spatial resolution.

Clause 73: The method of clause 72, wherein forming the VSRR message comprises forming the VSRR resolution change message to include a picture width field specifying a requested width of the reduced spatial resolution for the pictures of the second sequence of pictures picture and a picture height field specifying a requested height of the pictures of the second sequence of pictures.

Clause 74: The method of clause 72, wherein forming the VSRR message comprises forming the VSRR message as a region encoding message including a top offset field specifying a requested offset for a top of the pictures of the second sequence of pictures relative to a top of the pictures of the first sequence of pictures, a bottom offset field specifying a requested offset for a bottom of the pictures of the second sequence of pictures relative to a bottom of the pictures of the first sequence of pictures, a left offset field specifying a requested offset for a left side of the pictures of the second sequence of pictures relative to a left side of the pictures of the first sequence of pictures, and a right offset field specifying a requested offset for a right side of the pictures of the second sequence of pictures relative to a right side of the pictures of the first sequence of pictures.

Clause 75: The method of clause 71, further comprising receiving a video spatial resolution notification (VSRN) message specifying the reduced spatial resolution.

Clause 76: The method of clause 75, further comprising processing, from the VSRN message, a picture width field specifying a width of the pictures of the second sequence of pictures a picture height field specifying a height of the pictures of the second sequence of pictures.

Clause 77: The method of clause 75, further comprising processing, from the VSRN message, a top offset field specifying an offset for a top of the pictures of the second sequence of pictures relative to a top of the pictures of the first sequence of pictures, a bottom offset field specifying an offset for a bottom of the pictures of the second sequence of pictures relative to a bottom of the pictures of the first sequence of pictures, a left offset field specifying an offset for a left side of the pictures of the second sequence of pictures relative to a left side of the pictures of the first sequence of pictures, and a right offset field specifying an offset for a right side of the pictures of the second sequence of pictures relative to a right side of the pictures of the first sequence of pictures.

Clause 78: The method of clause 70, wherein the first resolution comprises a first frame rate for the first sequence of pictures, and wherein the reduced resolution comprises a second, reduced frame rate for the second sequence of pictures.

Clause 79: The method of clause 78, further comprising forming the message as a video temporal resolution request (VTRR) message requesting the reduced frame rate.

Clause 80: The method of clause 70, wherein the first resolution comprises a first spatial resolution for pictures of the first sequence of pictures, the reduced resolution comprises a second, reduced spatial resolution for pictures of the second sequence of pictures, and the first sequence of pictures has a first frame rate, the method further comprising forming the message to request both the reduced spatial resolution and a reduced frame rate for the second sequence of pictures.

Clause 81: The method of clause 70, wherein the first resolution comprises a first spatial resolution for pictures of the first sequence of pictures, the reduced resolution comprises a second, reduced spatial resolution for pictures of the second sequence of pictures, the first sequence of pictures has a first frame rate, and the message comprises a first message requesting the second, reduced spatial resolution for the pictures of the second sequence of pictures, the method further comprising sending a second message requesting a second, reduced frame rate for the second sequence of pictures.

Clause 82: The method of clause 70, wherein the message comprises a first message, the method further comprising sending a second message requesting a zero-valued resolution for a third sequence of pictures to indicate that only audio data is desired for a playback time corresponding to the third sequence of pictures.

Clause 83: The method of clause 70, wherein the message comprises a first message, the method further comprising, in response to determining that the client device is coupled to an external power source, sending a second message requesting enhanced resolution for a third sequence of pictures, the third sequence of pictures being subsequent to the second sequence of pictures in coding order.

Clause 84: A device for requesting a reduced resolution for video data, the device comprising: a memory configured to store video data; and one or more processors implemented in circuitry and configured to: decode a first sequence of pictures of a bitstream, the first sequence of pictures having a first resolution; in response to determining that the device is to enter a power saving mode, send a message requesting a reduced resolution relative to the first resolution for a second sequence of pictures, the second sequence of pictures being subsequent to the first sequence of pictures in coding order; and decode the second sequence of pictures of the video data of the bitstream, the second sequence of pictures having the reduced resolution.

Clause 85: The device of clause 84, wherein the first resolution comprises a first spatial resolution for pictures in the first sequence of pictures, and the reduced resolution comprises a second, reduced spatial resolution for pictures in the second sequence of pictures.

Clause 86: The device of clause 85, wherein the one or more processors are further configured to form the message as a video spatial resolution request (VSRR) message specifying the reduced spatial resolution.

Clause 87: The device of clause 86, wherein the one or more processors are configured to form the VSRR resolution change message to include a picture width field specifying a requested width of the reduced spatial resolution for the pictures of the second sequence of pictures picture and a picture height field specifying a requested height of the pictures of the second sequence of pictures.

Clause 88: The device of clause 86, wherein the one or more processors are configured to form the VSRR message as a region encoding message including a top offset field specifying a requested offset for a top of the pictures of the second sequence of pictures relative to a top of the pictures of the first sequence of pictures, a bottom offset field specifying a requested offset for a bottom of the pictures of the second sequence of pictures relative to a bottom of the pictures of the first sequence of pictures, a left offset field specifying a requested offset for a left side of the pictures of the second sequence of pictures relative to a left side of the pictures of the first sequence of pictures, and a right offset field specifying a requested offset for a right side of the pictures of the second sequence of pictures relative to a right side of the pictures of the first sequence of pictures.

Clause 89: The device of clause 85, wherein the one or more processors are further configured to receive a video spatial resolution notification (VSRN) message specifying the reduced spatial resolution.

Clause 90: The device of clause 89, wherein the one or more processors are further configured to process, from the VSRN message, a picture width field specifying a width of the pictures of the second sequence of pictures a picture height field specifying a height of the pictures of the second sequence of pictures.

Clause 91: The device of clause 89, wherein the one or more processors are further configured to process, from the VSRN message, a top offset field specifying an offset for a top of the pictures of the second sequence of pictures relative to a top of the pictures of the first sequence of pictures, a bottom offset field specifying an offset for a bottom of the pictures of the second sequence of pictures relative to a bottom of the pictures of the first sequence of pictures, a left offset field specifying an offset for a left side of the pictures of the second sequence of pictures relative to a left side of the pictures of the first sequence of pictures, and a right offset field specifying an offset for a right side of the pictures of the second sequence of pictures relative to a right side of the pictures of the first sequence of pictures.

Clause 92: The device of clause 84, wherein the first resolution comprises a first frame rate for the first sequence of pictures, and wherein the reduced resolution comprises a second, reduced frame rate for the second sequence of pictures.

Clause 93: The device of clause 92, wherein the one or more processors are configured to form the message as a video temporal resolution request (VTRR) message requesting the reduced frame rate.

Clause 94: The device of clause 84, wherein the first resolution comprises a first spatial resolution for pictures of the first sequence of pictures, the reduced resolution comprises a second, reduced spatial resolution for pictures of the second sequence of pictures, and the first sequence of pictures has a first frame rate, and wherein the one or more processors are further configured to form the message to request both the reduced spatial resolution and a reduced frame rate for the second sequence of pictures.

Clause 95: The device of clause 84, wherein the first resolution comprises a first spatial resolution for pictures of the first sequence of pictures, the reduced resolution comprises a second, reduced spatial resolution for pictures of the second sequence of pictures, the first sequence of pictures has a first frame rate, and the message comprises a first message requesting the second, reduced spatial resolution for the pictures of the second sequence of pictures, wherein the one or more processors are further configured to send a second message requesting a second, reduced frame rate for the second sequence of pictures.

Clause 96: The device of clause 84, further comprising a display configured to display decoded video data.

Clause 97: A computer-readable storage medium having stored thereon instructions that, when executed, cause a processor of a client device to: decode a first sequence of pictures of a bitstream, the first sequence of pictures having a first resolution; in response to determining that the device is to enter a power saving mode, send a message requesting a reduced resolution relative to the first resolution for a second sequence of pictures, the second sequence of pictures being subsequent to the first sequence of pictures in coding order; and decode the second sequence of pictures of the video data of the bitstream, the second sequence of pictures having the reduced resolution.

Clause 98: A device for requesting a reduced resolution for video data, the device comprising: means for decoding a first sequence of pictures of a bitstream, the first sequence of pictures having a first resolution; means for sending a message requesting a reduced resolution relative to the first resolution for a second sequence of pictures, the second sequence of pictures being subsequent to the first sequence of pictures in coding order in response to determining that the client device is to enter a power saving mode; and means for decoding the second sequence of pictures of the video data of the bitstream, the second sequence of pictures having the reduced resolution.

Clause 99: The device of clause 98, wherein the reduced resolution comprises at least one of a reduced spatial resolution or a reduced temporal resolution.

Clause 100: A method of requesting a reduced resolution for video data, the method comprising: decoding, by a video decoder of a client device, a first sequence of pictures of a bitstream, the first sequence of pictures having a first resolution; in response to determining that the client device is to enter a power saving mode, sending, by the client device, a message requesting a reduced resolution relative to the first resolution for a second sequence of pictures, the second sequence of pictures being subsequent to the first sequence of pictures in coding order; and decoding, by the video decoder of the client device, the second sequence of pictures of the video data of the bitstream, the second sequence of pictures having the reduced resolution.

Clause 101: The method of clause 100, wherein the first resolution comprises a first spatial resolution for pictures in the first sequence of pictures, and the reduced resolution comprises a second, reduced spatial resolution for pictures in the second sequence of pictures.

Clause 102: The method of clause 101, further comprising forming the message as a video spatial resolution request (VSRR) message specifying the reduced spatial resolution.

Clause 103: The method of clause 102, wherein forming the VSRR message comprises forming the VSRR resolution change message to include a picture width field specifying a requested width of the reduced spatial resolution for the pictures of the second sequence of pictures picture and a picture height field specifying a requested height of the pictures of the second sequence of pictures.

Clause 104: The method of clause 102, wherein forming the VSRR message comprises forming the VSRR message as a region encoding message including a top offset field specifying a requested offset for a top of the pictures of the second sequence of pictures relative to a top of the pictures of the first sequence of pictures, a bottom offset field specifying a requested offset for a bottom of the pictures of the second sequence of pictures relative to a bottom of the pictures of the first sequence of pictures, a left offset field specifying a requested offset for a left side of the pictures of the second sequence of pictures relative to a left side of the pictures of the first sequence of pictures, and a right offset field specifying a requested offset for a right side of the pictures of the second sequence of pictures relative to a right side of the pictures of the first sequence of pictures.

Clause 105: The method of any of clauses 100-104, further comprising receiving a video spatial resolution notification (VSRN) message specifying the reduced resolution.

Clause 106: The method of clause 105, further comprising processing, from the VSRN message, a picture width field specifying a width of the pictures of the second sequence of pictures a picture height field specifying a height of the pictures of the second sequence of pictures.

Clause 107: The method of clause 105, further comprising processing, from the VSRN message, a top offset field specifying an offset for a top of the pictures of the second sequence of pictures relative to a top of the pictures of the first sequence of pictures, a bottom offset field specifying an offset for a bottom of the pictures of the second sequence of pictures relative to a bottom of the pictures of the first sequence of pictures, a left offset field specifying an offset for a left side of the pictures of the second sequence of pictures relative to a left side of the pictures of the first sequence of pictures, and a right offset field specifying an offset for a right side of the pictures of the second sequence of pictures relative to a right side of the pictures of the first sequence of pictures.

Clause 108: The method of any of clauses 100-107, wherein the first resolution comprises a first frame rate for the first sequence of pictures, and wherein the reduced resolution comprises a second, reduced frame rate for the second sequence of pictures.

Clause 109: The method of clause 108, further comprising forming the message as a video temporal resolution request (VTRR) message requesting the reduced frame rate.

Clause 110: The method of any of clauses 100-109, wherein the first resolution comprises a first spatial resolution for pictures of the first sequence of pictures, the reduced resolution comprises a second, reduced spatial resolution for pictures of the second sequence of pictures, and the first sequence of pictures has a first frame rate, the method further comprising forming the message to request both the reduced spatial resolution and a reduced frame rate for the second sequence of pictures.

Clause 111: The method of any of clauses 100-109, wherein the first resolution comprises a first spatial resolution for pictures of the first sequence of pictures, the reduced resolution comprises a second, reduced spatial resolution for pictures of the second sequence of pictures, the first sequence of pictures has a first frame rate, and the message comprises a first message requesting the second, reduced spatial resolution for the pictures of the second sequence of pictures, the method further comprising sending a second message requesting a second, reduced frame rate for the second sequence of pictures.

Clause 112: The method of any of clauses 100-111, wherein the message comprises a first message, the method further comprising sending a second message requesting a zero-valued resolution for a third sequence of pictures to indicate that only audio data is desired for a playback time corresponding to the third sequence of pictures.

Clause 113: The method of any of clauses 100-112, wherein the message comprises a first message, the method further comprising, in response to determining that the client device is coupled to an external power source, sending a second message requesting enhanced resolution for a third sequence of pictures, the third sequence of pictures being subsequent to the second sequence of pictures in coding order.

Clause 114: A device for requesting a reduced resolution for video data, the device comprising: a memory configured to store video data; and one or more processors implemented in circuitry and configured to: decode a first sequence of pictures of a bitstream, the first sequence of pictures having a first resolution; in response to determining that the device is to enter a power saving mode, send a message requesting a reduced resolution relative to the first resolution for a second sequence of pictures, the second sequence of pictures being subsequent to the first sequence of pictures in coding order; and decode the second sequence of pictures of the video data of the bitstream, the second sequence of pictures having the reduced resolution.

Clause 115: The device of clause 114, wherein the first resolution comprises a first spatial resolution for pictures in the first sequence of pictures, and the reduced resolution comprises a second, reduced spatial resolution for pictures in the second sequence of pictures.

Clause 116: The device of clause 115, wherein the one or more processors are further configured to form the message as a video spatial resolution request (VSRR) message specifying the reduced spatial resolution.

Clause 117: The device of clause 116, wherein the one or more processors are configured to form the VSRR resolution change message to include a picture width field specifying a requested width of the reduced spatial resolution for the pictures of the second sequence of pictures picture and a picture height field specifying a requested height of the pictures of the second sequence of pictures.

Clause 118: The device of clause 116, wherein the one or more processors are configured to form the VSRR message as a region encoding message including a top offset field specifying a requested offset for a top of the pictures of the second sequence of pictures relative to a top of the pictures of the first sequence of pictures, a bottom offset field specifying a requested offset for a bottom of the pictures of the second sequence of pictures relative to a bottom of the pictures of the first sequence of pictures, a left offset field specifying a requested offset for a left side of the pictures of the second sequence of pictures relative to a left side of the pictures of the first sequence of pictures, and a right offset field specifying a requested offset for a right side of the pictures of the second sequence of pictures relative to a right side of the pictures of the first sequence of pictures.

Clause 119: The device of any of clauses 115-118, wherein the one or more processors are further configured to receive a video spatial resolution notification (VSRN) message specifying the reduced resolution.

Clause 120: The device of clause 119, wherein the one or more processors are further configured to process, from the VSRN message, a picture width field specifying a width of the pictures of the second sequence of pictures a picture height field specifying a height of the pictures of the second sequence of pictures.

Clause 121: The device of clause 119, wherein the one or more processors are further configured to process, from the VSRN message, a top offset field specifying an offset for a top of the pictures of the second sequence of pictures relative to a top of the pictures of the first sequence of pictures, a bottom offset field specifying an offset for a bottom of the pictures of the second sequence of pictures relative to a bottom of the pictures of the first sequence of pictures, a left offset field specifying an offset for a left side of the pictures of the second sequence of pictures relative to a left side of the pictures of the first sequence of pictures, and a right offset field specifying an offset for a right side of the pictures of the second sequence of pictures relative to a right side of the pictures of the first sequence of pictures.

Clause 122: The device of any of clauses 114-121, wherein the first resolution comprises a first frame rate for the first sequence of pictures, and wherein the reduced resolution comprises a second, reduced frame rate for the second sequence of pictures.

Clause 123: The device of clause 122, wherein the one or more processors are configured to form the message as a video temporal resolution request (VTRR) message requesting the reduced frame rate.

Clause 124: The device of any of clauses 114-123, wherein the first resolution comprises a first spatial resolution for pictures of the first sequence of pictures, the reduced resolution comprises a second, reduced spatial resolution for pictures of the second sequence of pictures, and the first sequence of pictures has a first frame rate, and wherein the one or more processors are further configured to form the message to request both the reduced spatial resolution and a reduced frame rate for the second sequence of pictures.

Clause 125: The device of any of clauses 114-123, wherein the first resolution comprises a first spatial resolution for pictures of the first sequence of pictures, the reduced resolution comprises a second, reduced spatial resolution for pictures of the second sequence of pictures, the first sequence of pictures has a first frame rate, and the message comprises a first message requesting the second, reduced spatial resolution for the pictures of the second sequence of pictures, wherein the one or more processors are further configured to send a second message requesting a second, reduced frame rate for the second sequence of pictures.

Clause 126: The device of any of clauses 114-125, further comprising a display configured to display decoded video data.

Clause 127: A computer-readable storage medium having stored thereon instructions that, when executed, cause a processor of a client device to: decode a first sequence of pictures of a bitstream, the first sequence of pictures having a first resolution; in response to determining that the device is to enter a power saving mode, send a message requesting a reduced resolution relative to the first resolution for a second sequence of pictures, the second sequence of pictures being subsequent to the first sequence of pictures in coding order; and decode the second sequence of pictures of the video data of the bitstream, the second sequence of pictures having the reduced resolution.

Clause 128: A device for requesting a reduced resolution for video data, the device comprising: means for decoding a first sequence of pictures of a bitstream, the first sequence of pictures having a first resolution; means for sending a message requesting a reduced resolution relative to the first resolution for a second sequence of pictures, the second sequence of pictures being subsequent to the first sequence of pictures in coding order in response to determining that the client device is to enter a power saving mode; and means for decoding the second sequence of pictures of the video data of the bitstream, the second sequence of pictures having the reduced resolution.

Clause 129: The device of clause 128, wherein the reduced resolution comprises at least one of a reduced spatial resolution or a reduced temporal resolution.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of requesting a reduced resolution for video data, the method comprising:
   decoding, by a video decoder of a client device, a first sequence of pictures of video data of a bitstream, the first sequence of pictures having a first spatial resolution;
   in response to determining that the client device is to enter a power saving mode:
      forming, by the client device, a message specifying a second, reduced spatial resolution relative to the first spatial resolution for a second sequence of pictures, the second sequence of pictures being subsequent to the first sequence of pictures in coding order, wherein forming the message comprises forming the message to include a picture width field specifying a requested width of the second, reduced spatial resolution for the pictures of the second sequence of pictures picture and a picture height field specifying a requested height of the second, reduced spatial resolution for the pictures of the second sequence of pictures, the second sequence of pictures being subsequent to the first sequence of pictures in coding order; and
      sending, by the client device, the message requesting the second, reduced spatial resolution relative to the first resolution for the second sequence of pictures; and
   decoding, by the video decoder of the client device, the second sequence of pictures of the video data of the bitstream, the second sequence of pictures having the second, reduced spatial resolution.

2. The method of claim 1, further comprising receiving a video spatial resolution notification (VSRN) message specifying the second, reduced spatial resolution.

3. The method of claim 2, further comprising processing, from the VSRN message, a picture width field specifying a width of the pictures of the second sequence of pictures a picture height field specifying a height of the pictures of the second sequence of pictures.

4. The method of claim 2, further comprising processing, from the VSRN message, a top offset field specifying an offset for a top of the pictures of the second sequence of pictures relative to a top of the pictures of the first sequence of pictures, a bottom offset field specifying an offset for a bottom of the pictures of the second sequence of pictures relative to a bottom of the pictures of the first sequence of pictures, a left offset field specifying an offset for a left side of the pictures of the second sequence of pictures relative to a left side of the pictures of the first sequence of pictures, and a right offset field specifying an offset for a right side of the pictures of the second sequence of pictures relative to a right side of the pictures of the first sequence of pictures.

5. The method of claim 1, wherein the first sequence of pictures comprises a first frame rate, and wherein the second sequence of pictures comprises a second, reduced frame rate.

6. The method of claim 5, further comprising forming a message requesting the second, reduced frame rate.

7. The method of claim 1, the method further comprising forming the message to request both the second, reduced spatial resolution and a reduced frame rate for the second sequence of pictures.

8. The method of claim 1, further comprising sending a second message requesting a second, reduced frame rate for the second sequence of pictures.

9. The method of claim 1, wherein the message comprises a first message, the method further comprising sending a second message requesting a zero-valued resolution for a third sequence of pictures to indicate that only audio data is desired for a playback time corresponding to the third sequence of pictures.

10. The method of claim 1, wherein the message comprises a first message, the method further comprising, in response to determining that the client device is coupled to an external power source, sending a second message requesting enhanced resolution for a third sequence of pictures, the third sequence of pictures being subsequent to the second sequence of pictures in coding order.

11. A method of requesting a reduced resolution for video data, the method comprising:
   decoding, by a video decoder of a client device, a first sequence of pictures of a bitstream, the first sequence of pictures having a first spatial resolution for the pictures in the first sequence of pictures;
   in response to determining that the client device is to enter a power saving mode:
      forming, by the client device, a message specifying a second, reduced spatial resolution relative to the first spatial resolution for a second sequence of pictures, the second sequence of pictures being subsequent to the first sequence of pictures in coding order, wherein forming the message comprises forming the message as a region encoding message including a top offset field specifying a requested offset for a top of the pictures of the second sequence of pictures relative to a top of the pictures of the first sequence of pictures, a bottom offset field specifying a requested offset for a bottom of the pictures of the second sequence of pictures relative to a bottom of the pictures of the first sequence of pictures, a left offset field specifying a requested offset for a left side of the pictures of the second sequence of pictures relative to a left side of the pictures of the first sequence of pictures, and a right offset field specifying a requested offset for a right side of the pictures of the second sequence of pictures relative to a right side of the pictures of the first sequence of pictures; and sending, by the client device, the message requesting the second, reduced spatial resolution relative to the first spatial resolution for the second sequence of pictures; and decoding, by the video decoder of the client device, the second sequence of pictures of the video data of the bitstream, the second sequence of pictures having the second, reduced spatial resolution.

12. A device for requesting a reduced resolution for video data, the device comprising:

a memory configured to store video data; and a processing system comprising one or more processors implemented in circuitry, the processing system being configured to:

decode a first sequence of pictures of video data of a bitstream, the first sequence of pictures having a first spatial resolution;

in response to determining that the device is to enter a power saving mode:

form a message specifying a second, reduced spatial resolution relative to the first spatial resolution for a second sequence of pictures, the second sequence of pictures being subsequent to the first sequence of pictures in coding order, wherein the processing system is configured to form the message to include a picture width field specifying a requested width of the second, reduced spatial resolution for the pictures of the second sequence of pictures picture and a picture height field specifying a requested height of the second, reduced spatial resolution for the pictures of the second sequence of pictures, the second sequence of pictures being subsequent to the first sequence of pictures in coding order; and send the message requesting the second, reduced spatial resolution relative to the first spatial resolution for the second sequence of pictures; and decode the second sequence of pictures of the video data of the bitstream, the second sequence of pictures having the second, reduced spatial resolution.

13. The device of claim 12, wherein the processing system is further configured to receive a video spatial resolution notification (VSRN) message specifying the second, reduced spatial resolution.

14. The device of claim 13, wherein the processing system is further configured to process, from the VSRN message, a picture width field specifying a width of the pictures of the second sequence of pictures a picture height field specifying a height of the pictures of the second sequence of pictures.

15. The device of claim 13, wherein the processing system is further configured to process, from the VSRN message, a top offset field specifying an offset for a top of the pictures of the second sequence of pictures relative to a top of the pictures of the first sequence of pictures, a bottom offset field specifying an offset for a bottom of the pictures of the second sequence of pictures relative to a bottom of the pictures of the first sequence of pictures, a left offset field specifying an offset for a left side of the pictures of the second sequence of pictures relative to a left side of the pictures of the first sequence of pictures, and a right offset field specifying an offset for a right side of the pictures of the second sequence of pictures relative to a right side of the pictures of the first sequence of pictures.

16. The device of claim 12, wherein the first sequence of pictures comprises a first frame rate, and wherein the second sequence of pictures comprises a second, reduced frame rate.

17. The device of claim 16, wherein the processing system is further configured to form a message requesting the second, reduced frame rate.

18. The device of claim 12, wherein the processing system is further configured to form the message to request both the second, reduced spatial resolution and a reduced frame rate for the second sequence of pictures.

19. The device of claim 12, wherein the processing system is further configured to send a second message requesting a second, reduced frame rate for the second sequence of pictures.

20. The device of claim 12, further comprising a display configured to display decoded video data.

21. A device for requesting a reduced resolution for video data, the device comprising:

a memory configured to store video data; and a processing system comprising one or more processors implemented in circuitry, the processing system being configured to:

decode a first sequence of pictures of video data of a bitstream, the first sequence of pictures having a first spatial resolution;

in response to determining that the device is to enter a power saving mode:

form a message specifying a second, reduced spatial resolution relative to the first spatial resolution for a second sequence of pictures, the second sequence of pictures being subsequent to the first sequence of pictures in coding order, wherein the processing system is configured to form the message as a region encoding message including a top offset field specifying a requested offset for a top of the pictures of the second sequence of pictures relative to a top of the pictures of the first sequence of pictures, a bottom offset field specifying a requested offset for a bottom of the pictures of the second sequence of pictures relative to a bottom of the pictures of the first sequence of pictures, a left offset field specifying a requested offset for a left side of the pictures of the second sequence of pictures relative to a left side of the pictures of the first sequence of pictures, and a right offset field specifying a requested offset for a right side of the pictures of the second sequence of pictures relative to a right side of the pictures of the first sequence of pictures; and send the message requesting the second, reduced spatial resolution relative to the first spatial resolution for the second sequence of pictures; and decode the second sequence of pictures of the video data of the bitstream, the second sequence of pictures having the second, reduced spatial resolution.

22. A non-transitory computer-readable storage medium having stored thereon instructions that, when executed, cause a processing system of a client device to:

decode a first sequence of pictures of video data of a bitstream, the first sequence of pictures having a first spatial resolution;

in response to determining that the client device is to enter a power saving mode:

form a message specifying a second, reduced spatial resolution relative to the first spatial resolution for a second sequence of pictures, the second sequence of pictures being subsequent to the first sequence of pictures in coding order, wherein the instructions that cause the processing system to form the message comprise instructions that cause the processing system to form the message to include a picture width field specifying a requested width of the second, reduced spatial resolution for the pictures of the second sequence of pictures picture and a picture height field specifying a requested height of the second, reduced spatial resolution for the pictures of the second sequence of pictures, the second sequence of pictures being subsequent to the first sequence of pictures in coding order; and send the message requesting the second, reduced spatial resolution relative to the first spatial resolution for the second sequence of pictures; and decode the second sequence of pictures of the video data of the bitstream, the second sequence of pictures having the second, reduced spatial resolution.

23. A device for requesting a reduced resolution for video data, the device comprising:

means for decoding a first sequence of pictures of video data of a bitstream, the first sequence of pictures having a first spatial resolution;

means for forming, in response to determining that the device is to enter a power saving mode, a message specifying a second, reduced spatial resolution relative to the first spatial resolution for a second sequence of pictures, the second sequence of pictures being subsequent to the first sequence of pictures in coding order, wherein the means for forming the message comprises means for forming the message to include a picture width field specifying a requested width of the second, reduced spatial resolution for the pictures of the second sequence of pictures picture and a picture height field specifying a requested height of the second, reduced spatial resolution for the pictures of the second sequence of pictures, the second sequence of pictures being subsequent to the first sequence of pictures in coding order;

means for sending the message requesting the second, reduced spatial resolution relative to the first resolution for the second sequence of pictures; and means for decoding the second sequence of pictures of the video data of the bitstream, the second sequence of pictures having the second, reduced spatial resolution.

24. The device of claim 23, wherein the means for forming the message comprise means for forming the message to request a reduced temporal resolution for the second sequence of pictures.

* * * * *